(12) United States Patent
Yamada et al.

(10) Patent No.: US 7,764,393 B2
(45) Date of Patent: Jul. 27, 2010

(54) PRINT SYSTEM, IMAGE SUPPLY DEVICE, PRINT APPARATUS, AND CONTROL METHOD THEREOF

(75) Inventors: Akitoshi Yamada, Yokohama (JP); Takao Aichi, Tokyo (JP); Kazuyuki Masumoto, Yokohama (JP); Hiromitsu Hirabayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 825 days.

(21) Appl. No.: 11/678,348

(22) Filed: Feb. 23, 2007

(65) Prior Publication Data

US 2007/0133052 A1 Jun. 14, 2007

Related U.S. Application Data

(63) Continuation of application No. PCT/JP2005/014988, filed on Aug. 17, 2005.

(30) Foreign Application Priority Data

Aug. 25, 2004 (JP) .............................. 2004-245689

(51) Int. Cl.
*G06F 15/00* (2006.01)
*H04N 5/225* (2006.01)

(52) U.S. Cl. .................................... 358/1.15; 348/207.2

(58) Field of Classification Search ................ 358/1.15, 358/1.16, 1.14, 1.18, 1.13, 302, 400, 518, 358/453; 710/10, 11, 16, 29, 104; 248/207.2; 386/46, 95, 117; 709/210, 213, 217, 208; 345/520, 522; 370/438
See application file for complete search history.

(56) References Cited

U.S. PATENT DOCUMENTS 5,630,032 A * 5/1997 Yamaguchi et al. ........ 358/1.16

6,334,161 B1 12/2001 Suzuki et al.

(Continued)

FOREIGN PATENT DOCUMENTS

EP 1 429 533 A2 6/2004

(Continued)

OTHER PUBLICATIONS

Translation of International Preliminary Report on Patentability issued in corresponding PCT application No. PCT/JP2005/014988.

(Continued)

*Primary Examiner*—Saeid Ebrahimi Dehkordy
(74) *Attorney, Agent, or Firm*—Fitzpatrick, Cella, Harper & Scinto

(57) ABSTRACT

There is provided a print system for transmitting and receiving a data object by a PTP between a camera-equipped mobile phone (CP) and a PD printer and printing an image by the PD printer according to image data supplied from the CP. First information indicating presence/absence of the direct print function capable of printing by transmitting image data from the CP directly to the PD printer and second information indicating presence/absence of the cooperated processing function with the CP and the PD printer are embedded in a data object which is transmitted and received. When it is judged that the received object contains the first and the second information, the CP and the printer are set to the direct print function and the cooperated processing function mode.

43 Claims, 29 Drawing Sheets

U.S. PATENT DOCUMENTS

| | | |
|---|---|---|
| 6,425,019 B1 | 7/2002 | Tateyama et al. |
| 6,603,737 B1 | 8/2003 | Fukunaga et al. |
| 7,062,579 B2 | 6/2006 | Tateyama et al. |
| 2001/0042142 A1 | 11/2001 | Fukunaga et al. |
| 2003/0067620 A1 | 4/2003 | Masumoto et al. ......... 358/1.13 |
| 2004/0021902 A1 | 2/2004 | Ogiwara et al. .......... 358/1.115 |
| 2004/0041865 A1 | 3/2004 | Yano et al. .................... 347/14 |
| 2004/0046990 A1 | 3/2004 | Yano et al. ................. 358/1.15 |
| 2004/0070672 A1 | 4/2004 | Iwami et al. |
| 2004/0160632 A1 | 8/2004 | Kato et al. ................. 358/1.15 |
| 2004/0252335 A1 | 12/2004 | Yano et al. ................. 358/1.15 |
| 2005/0024497 A1 | 2/2005 | Sakamoto et al. ........ 348/207.2 |
| 2005/0088689 A1 | 4/2005 | Suga et al. |
| 2006/0044395 A1 | 3/2006 | Aichi et al. .............. 348/207.2 |
| 2006/0072895 A1 | 4/2006 | Yamada et al. ................. 386/46 |
| 2006/0098938 A1 | 5/2006 | Goto et al. .................... 386/46 |
| 2007/0133052 A1 | 6/2007 | Yamada et al. ............. 358/1.15 |
| 2007/0195362 A1 | 8/2007 | Yamada et al. ............. 358/1.15 |

FOREIGN PATENT DOCUMENTS

| | | |
|---|---|---|
| JP | 10-290247 | 10/1998 |
| JP | 2004-009388 | 1/2004 |
| JP | 2004-129218 | 4/2004 |

OTHER PUBLICATIONS

European Search Report dated Oct. 1, 2008 in application No. 05772739.8—1228/1792742 PCT/JP2005014988.

* cited by examiner

FIG. 9

| Field | Description Format |
|---|---|
| OBJECT FORMAT | OBJECT FORMAT CODE | 901 |
| OBJECT SIZE | UNSIGNED INTEGER 32 bit |
| THUMBNAIL FORMAT | OBJECT FORMAT CODE |
| THUMBNAIL SIZE | UNSIGNED INTEGER 32 bit |
| THUMBNAIL WIDTH | UNSIGNED INTEGER 32 bit |
| THUMBNAIL HEIGHT | UNSIGNED INTEGER 32 bit |
| IMAGE WIDTH | UNSIGNED INTEGER 32 bit |
| IMAGE HEIGHT | UNSIGNED INTEGER 32 bit |
| FILE NAME | CHARACTER STRING |
| GENERATION DATE/TIME | CHARACTER STRING INDICATING DATE |
| MODIFICATION DATE/TIME | CHARACTER STRING INDICATING DATE |
| KEYWORD | CHARACTER STRING |

FIG. 10

| Field | DESCRIPTION FORMAT | |
|---|---|---|
| OBJECT FORMAT | SCRIPT | 901 |
| OBJECT SIZE | 0 | 902 |
| THUMBNAIL FORMAT | NOT AVAILABLE | 903 |
| THUMBNAIL SIZE | 0 | 904 |
| THUMBNAIL WIDTH | 0 | 905 |
| THUMBNAIL HEIGHT | 0 | 906 |
| IMAGE WIDTH | 0 | 907 |
| IMAGE HEIGHT | 0 | 908 |
| FILE NAME | Direct-Print-DSC | 909 |
| GENERATION DATE/TIME | ARBITRARY | 910 |
| MODIFICATION DATE/TIME | ARBITRARY | 911 |
| KEYWORD | ARBITRARY | 912 |

FIG. 11

| Field | DESCRIPTION FORMAT | |
|---|---|---|
| OBJECT FORMAT | SCRIPT | 901 |
| OBJECT SIZE | 0 | 902 |
| THUMBNAIL FORMAT | NOT AVAILABLE | 903 |
| THUMBNAIL SIZE | 0 | 904 |
| THUMBNAIL WIDTH | 0 | 905 |
| THUMBNAIL HEIGHT | 0 | 906 |
| IMAGE WIDTH | 0 | 907 |
| IMAGE HEIGHT | 0 | 908 |
| FILE NAME | Direct-Print-PRT | 909 |
| GENERATION DATE/TIME | ARBITRARY | 910 |
| MODIFICATION DATE/TIME | ARBITRARY | 911 |
| KEYWORD | ARBITRARY | 912 |

FIG. 12A

| Field | DESCRIPTION FORMAT | |
|---|---|---|
| OBJECT FORMAT | SCRIPT | 901 |
| OBJECT SIZE | 0 | 902 |
| THUMBNAIL FORMAT | NOT AVAILABLE | 903 |
| THUMBNAIL SIZE | 0 | 904 |
| THUMBNAIL WIDTH | 0 | 905 |
| THUMBNAIL HEIGHT | 0 | 906 |
| IMAGE WIDTH | 0 | 907 |
| IMAGE HEIGHT | 0 | 908 |
| FILE NAME | Direct-Print-DSC | 909 |
| GENERATION DATE/TIME | ARBITRARY | 910 |
| MODIFICATION DATE/TIME | ARBITRARY | 911 |
| KEYWORD | Special-CP | 912 |

FIG. 12B

| Field | DESCRIPTION FORMAT |
|---|---|
| OBJECT FORMAT | SCRIPT |
| OBJECT SIZE | 0 |
| THUMBNAIL FORMAT | NOT AVAILABLE |
| THUMBNAIL SIZE | 0 |
| THUMBNAIL WIDTH | 0 |
| THUMBNAIL HEIGHT | 0 |
| IMAGE WIDTH | 0 |
| IMAGE HEIGHT | 0 |
| FILE NAME | Direct-Print-PRT |
| GENERATION DATE/TIME | ARBITRARY |
| MODIFICATION DATE/TIME | ARBITRARY |
| KEYWORD | Special-PRT |

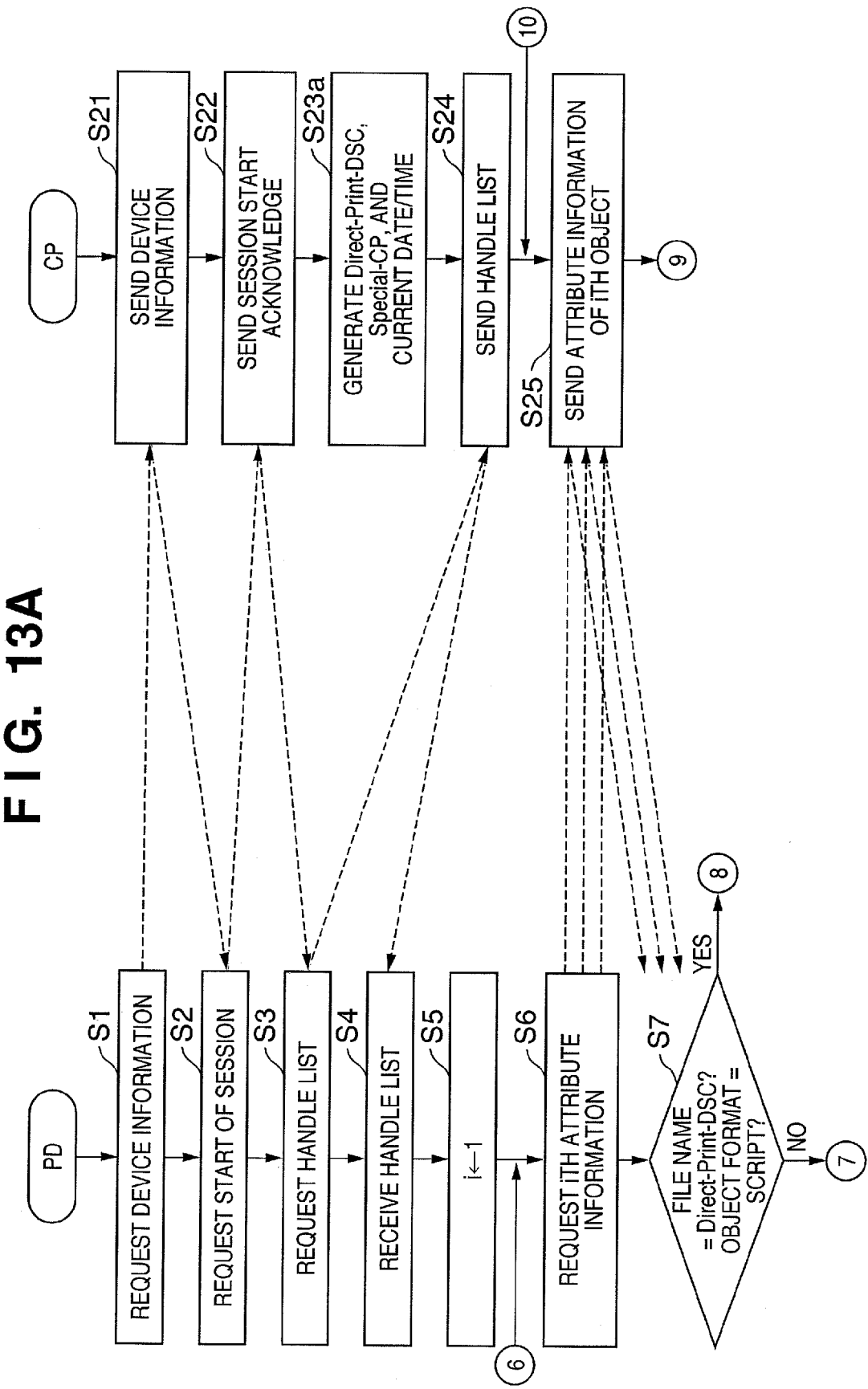

FIG. 14

| Field | Description Format |
|---|---|
| OBJECT FORMAT | SCRIPT |
| OBJECT SIZE | 0 |
| THUMBNAIL FORMAT | NOT AVAILABLE |
| THUMBNAIL SIZE | 0 |
| THUMBNAIL WIDTH | 0 |
| THUMBNAIL HEIGHT | 0 |
| IMAGE WIDTH | 0 |
| IMAGE HEIGHT | 0 |
| FILE NAME | Direct-Print-DSC |
| GENERATION DATE/TIME | ARBITRARY |
| MODIFICATION DATE/TIME | CURRENT DATE/TIME |
| KEYWORD | Special-CP |

FIG. 15

| Field | Description Format |
|---|---|
| OBJECT FORMAT | SCRIPT |
| OBJECT SIZE | 0 |
| THUMBNAIL FORMAT | NOT AVAILABLE |
| THUMBNAIL SIZE | 0 |
| THUMBNAIL WIDTH | 0 |
| THUMBNAIL HEIGHT | 0 |
| IMAGE WIDTH | 0 |
| IMAGE HEIGHT | 0 |
| FILE NAME | Direct-Print-PRT |
| GENERATION DATE/TIME | ARBITRARY |
| MODIFICATION DATE/TIME | RECOVERY DATE/TIME |
| KEYWORD | Special-PRT |

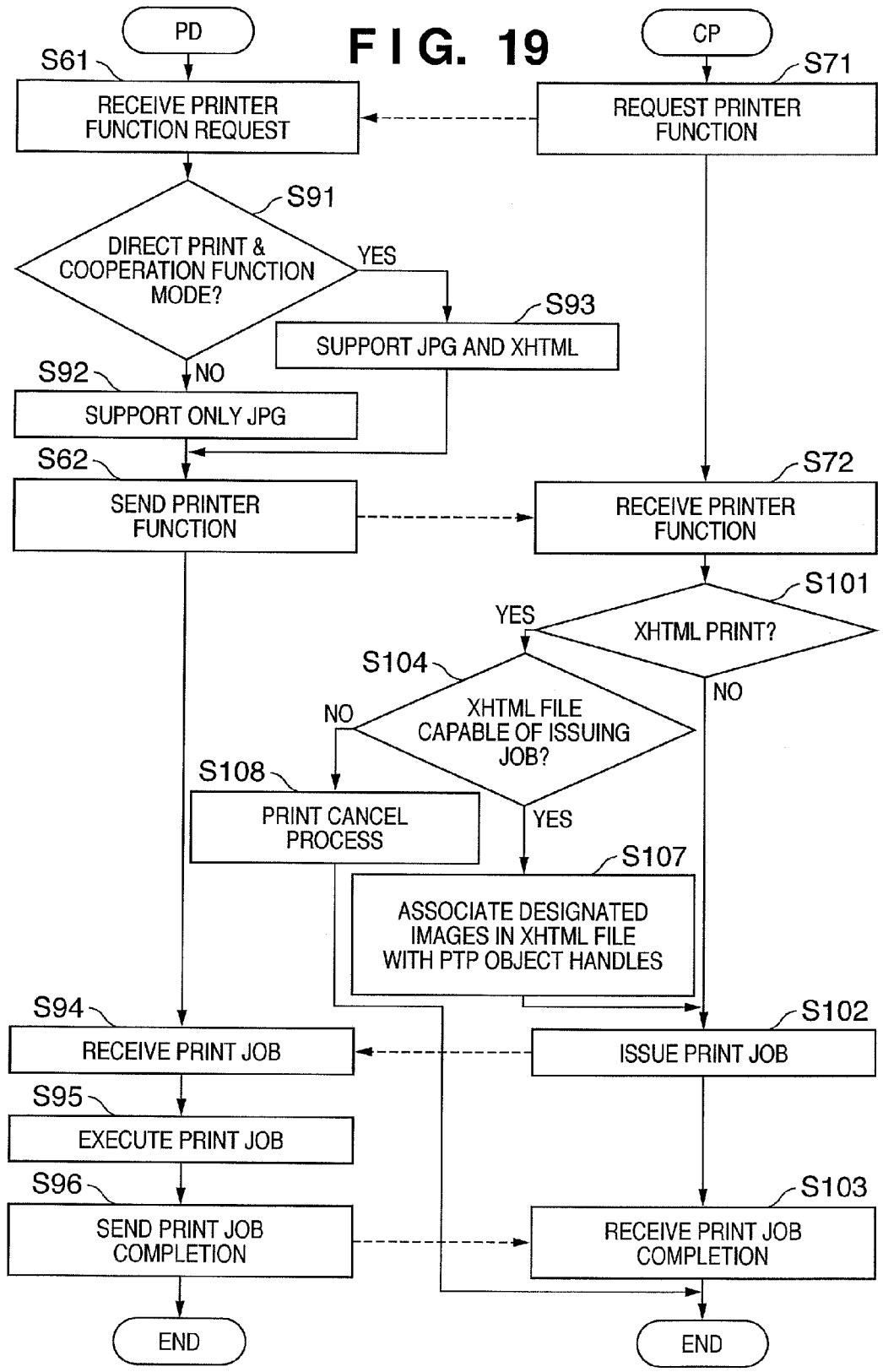

FIG. 20A

ORIGINAL XHTML FILE

```xml
<?xml version="1.0" encoding="Shift_JIS"?>
<!DOCTYPE html PUBLIC "-//W3C//DTD XHTML 1.0 Strict//EN" "http://www.w3org/TR/xhtml1/DTD/xhtml1-strict.dtd">
<html xmlns="http://www.w3.org/1999/xhtml" xml:lang="ja" lang="ja">
    <head>
        <title>Original XHTML file</title>
    </head>
    <body>
        <p>
            <img src="xyz/a.jpg" />
            <img src="xyz/b.jpg" />
            <img src="xyz/c.jpg" />
        </p>
    </body>
</html>
```

F I G. 20B

XHTML FILE ASSOCIATED WITH PTP OBJECT HANDLES

```
<?xml version="1.0" encoding="Shift_JIS"?>
<!DOCTYPE html PUBLIC "-//W3C//DTD XHTML 1.0 Strict//EN" "http://www.w3.org/TR/xhtml1/DTD/xhtml1-strict.dtd">
<html xmlns="http://www.w3.org/1999/xhtml" xml:lang="ja" lang="ja">
    <head>
        <title>Modified XHTML file</title>
    </head>
    <body>
        <p>
            <img src="0000000A" />
            <img src="0000000B" />
            <img src="0000000C" />
        </p>
    </body>
</html>
```

FIG. 21A

ORIGINAL XHTML FILE

```
<?xml version="1.0" encoding="Shift_JIS"?>
<!DOCTYPE html PUBLIC "-//W3C//DTD XHTML 1.0 Strict//EN" "http://www.w3org/TR/xhtml1/DTD/xhtml1-strict.dtd">
<html xmlns="http://www.w3.org/1999/xhtml" xml:lang="ja" lang="ja">
  <head>
    <title>Original XHTML file</title>
  </head>
  <body>
    <p>
      <img src="xyz/a.jpg" />
      <img src="xyz/b.jpg" />
      <img src="xyz/c.jpg" />
    </p>
  </body>
</html>
```

F I G. 21B

TXT FILE GENERATED BY ASSOCIATION PROCESS WITH PTP OBJECT HANDLES

```
<relation>
  <image>
    <source>xyz/a.jpg</source>
    <handle>0000000A</handle>
  </image>
  <image>
    <source>xyz/b.jpg</source>
    <handle>0000000B</handle>
  </image>
  <image>
    <source>xyz/c.jpg</source>
    <handle>0000000C</handle>
  </image>
</relation>
```

PRINT SYSTEM, IMAGE SUPPLY DEVICE, PRINT APPARATUS, AND CONTROL METHOD THEREOF

This application is a continuation of International Application No. PCT/JP2005/014988 filed Aug. 17, 2005.

TECHNICAL FIELD

The present invention relates to a print system which has an image supply device and a print apparatus and causes the print apparatus to print an image based on image data supplied from the image supply device, the image supply device, the print apparatus, and a control method thereof.

BACKGROUND ART

So-called direct print is known in which a digital still camera (DSC) directly connects to a printer, an image held in the DSC is selected by using its display device, and the image file of the selected image is transmitted from the DSC to the printer to print the image. The direct print is advantageous because it allows easy print without intervention of a personal computer (PC).

Patent reference 1 describes an arrangement in which a printer receives an image file from a DSC by using a general-purpose communication means provided in the printer to connect to a PC and the direct print is implemented. In patent reference 1, the DSC and printer exchange information defined by direct print specifications and recognize each other as devices compatible with the direct print. If they are compatible with the direct print, the DSC receives Capability (print function information) from the printer and sets a print mode corresponding to Capability to execute print.

FIG. 22 depicts a view for explaining the outline of a procedure of causing a digital still camera (DSC) and a printer (PRT) to recognize that they have a direct print function.

Referring to FIG. 22, the PRT is a printer compatible with a photo-direct print function, and the DSC is compatible with direct print. The PRT transmits "Request Direct-Print-DSC ID" to the DSC to request information (Direct-Print-DSC ID) indicating that the DSC is compatible with direct print (101). If the DSC is compatible with direct print, it transmits ID information containing "Direct-Print-DSC ID" to the PRT (102). The PRT transmits ID information (Direct-Print-PRT ID) indicating that it is compatible with a direct print function (103).

According to this example, the PRT recognizes at the timing 102 that the DSC is compatible with the direct print function. The DSC recognizes at the timing 103 that the PRT is compatible with the direct print function. If this procedure is not completed, they recognize each other as devices incompatible with the direct print function.

Patent reference 1: Japanese Patent Laid-Open No. 2004-9388

DISCLOSURE OF INVENTION

Problems that the Invention is to Solve

The above-described direct print function is implemented not only between a camera and a printer but also between a printer and a camera-equipped cellular phone (to be referred to as a CP hereafter) which is recently becoming popular rapidly. Direct print between a camera-equipped cellular phone and a printer implements a cooperation function as another communication protocol that uses even a function unique to the camera-equipped cellular phone, unlike direct print function between a camera and a printer. This cooperation function assumes to provide an expanded function of the above-described direct print protocol.

In the conventional technique of direct print protocol, devices that communicate with each other mutually confirm whether they are compatible with the direct print protocol. However, there is no means for inquiring about the presence of a cooperation function as an expansion of the protocol. It is difficult and impractical to update the programs of existing products on the market to install the cooperation function. The present invention therefore has as an object to install the cooperation function while maintaining the connectivity to a device having only the conventional protocol as much as possible.

A failure that may occur without application of the present invention will be described first. When a device connects to a printer, the printer needs to recognize whether the partner device is a camera having the conventional direct print function or a camera-equipped cellular phone having even the cooperation function. A command to confirm whether a device is a camera-equipped cellular phone with a cooperation function will be called "Special-CP ID".

Referring to FIG. 23, a printer (PRT) compatible with direct print and the above-described cooperation function and a camera (DSC) compatible with only direct print are connected. At this time, after the PRT and DSC have confirmed that they have the direct print function (101 to 103), the PRT transmits "Request Special-CP ID" to the DSC to ask whether it is a camera-equipped cellular phone having even a cooperation function (104). Even when not the DSC but a CP is connected to the PRT in FIG. 23, the CP returns "Direct-Print-DSC ID" in 102. For this reason, the printer cannot identify the partner device as a DSC or CP with only the procedures 101 to 103. The DSC which is not a camera-equipped cellular phone has no means for returning a response (105) to the request of 104. That is, the DSC does not assume reception of such a request command after confirming the direct print function at a high probability. Hence, upon receiving this command, the DSC may be unable to continue the process. The DSC may recognize it as an operation error of the PRT and terminate device recognition for the safety. As a result, the direct print function is not executed. In the worst case, the DSC and/or PRT may freeze during communication.

FIG. 24 depicts a view explaining a failure that occurs when a DSC is connected to a PRT, and the PRT issues, to the DSC, a command to confirm the direct print function with a camera-equipped cellular phone.

The PRT is compatible with the direct print and a cooperation function with a CP. The DSC is compatible with the direct print but incompatible with the above-described cooperation function because it is not a cellular phone.

In this state, the PRT requests, of the DSC, information (Special-CP ID) indicating a CP compatible with the cooperation function in 110 (Request Special-CP ID). In 111, the DSC that is incompatible with the cooperation function returns no response. Hence, the PRT may determine that the DSC is also incompatible with the direct print function and disconnect communication for the direct print.

As described above, if the conventional confirmation process between a camera and a printer is applied as it is to confirm whether or not a device is compatible with the above-described cooperation function, it may be impossible to guarantee communication connection between existing devices compatible with the direct print function.

Creating a new command to confirm such a new function and changing an existing communication protocol are not practical because it may cause a change in design of various devices and necessity of a new communication protocol.

It is an object of the present invention to solve the above-described problems of the prior art.

It is a characteristic feature of the present invention to provide a print apparatus and an image supply device which can safely and reliably confirm each other by confirming whether or not they are compatible with a direct print function and a new function without changing the existing communication protocol, a print system comprising the print apparatus and image supply device, and a control method thereof.

Means of Solving the Problems

A print system according to an aspect of the present invention has the following arrangement. That is, there is provided a print system which transmits/receives a data object between an image supply device and a print apparatus using a general-purpose communication protocol and causes the print apparatus to print an image on the basis of image data supplied from the image supply device, characterized by comprising:

transmission means for transmitting, to the print apparatus, the data object containing first information indicating presence/absence of a direct print function capable of directly transmitting image data from the image supply device to the print apparatus and printing and second information indicating presence/absence of a cooperated processing function with the direct print function;

determination means for receiving the data object and determining whether the data object contains the first information and the second information; and mode setting means for setting the direct print function and cooperated processing function mode, in a case where the determination means determines that the data object contains the first information and the second information, and setting the direct print function mode, in a case where the determination means determines that the data object contains only the first information.

An image supply device according to an aspect of the present invention has the following arrangement. That is, there is provided an image supply device which transmits/receives a data object using a general-purpose communication protocol and supplies image data to a print apparatus, characterized by comprising:

transmission means for transmitting, to the print apparatus, the data object containing first information indicating presence/absence of a direct print function capable of directly transmitting image data to the print apparatus and printing and second information indicating presence/absence of a cooperated processing function with the direct print function;

determination means for receiving the data object and determining whether the data object contains the first information and the second information; and mode setting means for setting the direct print function and cooperated processing function mode, in a case where the determination means determines that the data object contains the first information and the second information, and setting the direct print function mode, in a case where the determination means determines that the data object contains only the first information.

EFFECTS OF THE INVENTION

According to the present invention, it is possible to safely confirm each other's devices by confirming compatibility with the direct print function and a new function without changing an existing communication protocol.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9 depicts a view for explaining the data format of attribute information according to the embodiment;

FIG. 10 depicts a view for explaining an example of attribute information generated by a DSC compatible with only the direct print function according to the embodiment;

FIG. 11 depicts a view for explaining an example of attribute information generated by a PD printer compatible with only the direct print function according to the embodiment;

FIG. 12A depicts a view for explaining an example of attribute information of a CP compatible with the direct print function and cooperation function according to the embodiment;

FIG. 12B depicts a view for explaining an example of attribute information of a printer compatible with the direct print function and cooperation function according to the embodiment;

FIGS. 13A and 13B are flowcharts for explaining a procedure of causing a CP and a PD printer according to the second embodiment of the present invention to recognize a direct print function and a cooperation function;

FIG. 14 depicts a view for explaining an example of attribute information generated by a CP 3020 compatible with the direct print function and cooperation function according to the second embodiment;

FIG. 15 depicts a view for explaining an example of attribute information according to the second embodiment;

FIG. 19 is a flowchart for explaining an implementation example of a cooperation function between a CP and a PD printer according to the fifth embodiment of the present invention;

FIGS. 20A and 20B depict views for explaining an example of a process of associating designated images in an XHTML file with PTP object handles according to the fifth embodiment;

FIGS. 21A and 21B depict views for explaining another example of the process of associating designated images in an XHTML file with object handles in PTP according to the fifth embodiment;

BEST MODE FOR CARRYING OUT THE INVENTION

Preferred embodiments of the present invention will be described below in detail with reference to the accompanying drawings. In this embodiment, a printer and a system capable of directly communicating with a digital camera or a camera-equipped cellular phone will be exemplified. Some recent digital cameras and camera-equipped cellular phones can take and store even a moving image. A device with such a function will also be referred to as a digital camera (DSC) because it has the basic principle on still image capturing. However, the present invention is not limited to the embodiment.

Figure 1:
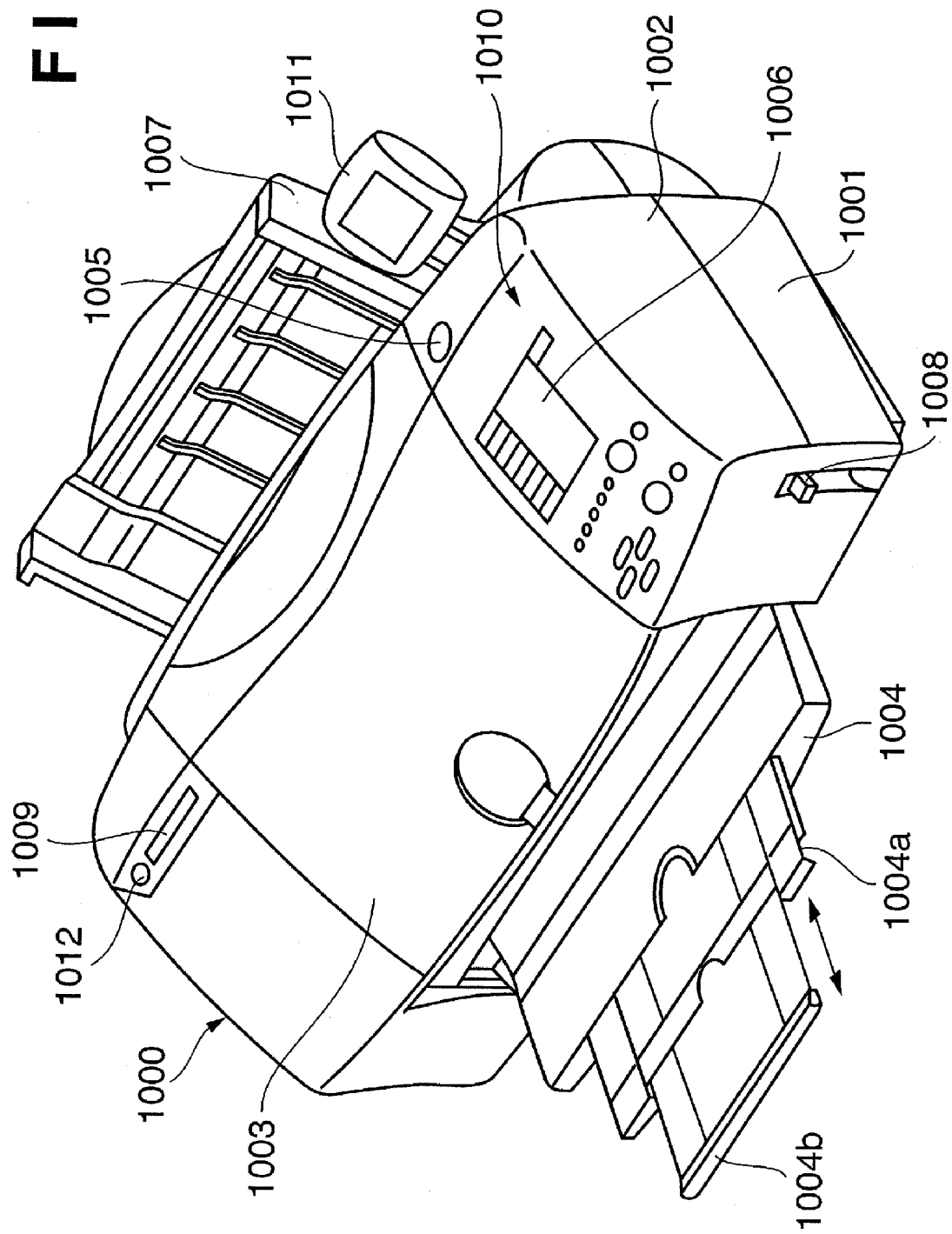
FIG. 1 depicts a schematic perspective view showing a photo-direct printer device according to an embodiment of the present invention.

FIG. 1 depicts a schematic perspective view showing a photo-direct printer device (to be referred to as a PD printer hereinafter) 1000 according to an embodiment of the present invention. The PD printer 1000 has a normal PC printer function of receiving data from a host computer (PC) and printing it and a function of directly reading and printing image data stored in a storage medium such as a memory card or receiving image data from a digital camera or PDA and printing it.

Referring to FIG. 1, the main body that forms the casing of the PD printer 1000 according to the embodiment has casing members: a lower case 1001, upper case 1002, access cover 1003, and discharge tray 1004. The lower case 1001 forms almost the lower half of the PD printer 1000, whereas the upper case 1002 forms almost the upper half of the main body. These cases combine and form a hollow structure with a storage space to store mechanisms (to be described later). The upper and front surfaces have openings. The lower case 1001 rotatably holds the discharge tray 1004 at one end. As the discharge tray 1004 rotates, the opening in the front surface of the lower case 1001 opens/closes. Upon print, the discharge tray 1004 rotates to the front side and opens to discharge printed sheets (including normal paper, dedicated paper, and resin sheets, all of which will simply be referred to as sheets hereinafter) from the opening and sequentially stack the discharged sheets. The discharge tray 1004 houses two auxiliary trays 1004a and 1004b. The sheet support area can be increased/reduced in three steps by pulling out the trays to front side, as needed.

The upper case 1002 holds the access cover 1003 at one end so as to open/close the opening formed in the upper surface. Opening the access cover 1003 enables exchanging a printhead cartridge (not shown), ink tank (not shown), or the like stored in the main body. A projection (not shown) formed on the back surface of the access cover 1003 rotates a cover opening/closing lever when the access cover 1003 opens/closes. The lever rotation position is detected by, e.g., a microswitch to detect the open/closed state of the access cover 1003.

The upper case 1002 has a power key 1005 on its upper surface. The upper case 1002 has, on its right side, an operation panel 1010 with a liquid crystal display unit 1006 and various kinds of key switches. The structure of the operation panel 1010 will be described later in detail with reference to FIG. 2. An automatic feeder 1007 automatically feeds sheets into the device main body. A paper interval selection lever 1008 adjusts the interval between the printhead and sheets. A card slot 1009 receives an adapter capable of mounting a memory card. The printer can directly receive, via the adapter, image data stored in the memory card and print it. Examples of the memory card (PC) are a compact Flash® memory, smart media, and memory stick. A viewer (liquid crystal display unit) 1011 is detachable from the main body of the PD printer 1000. The viewer 1011 displays every frame image or index images in a case that the user wants to search for a print target from images stored in the PC card. A USB terminal 1012 connects a digital camera (to be described later). The PD device 1000 has, on its back surface, a USB connector to connect a personal computer (PC).

Figure 2:
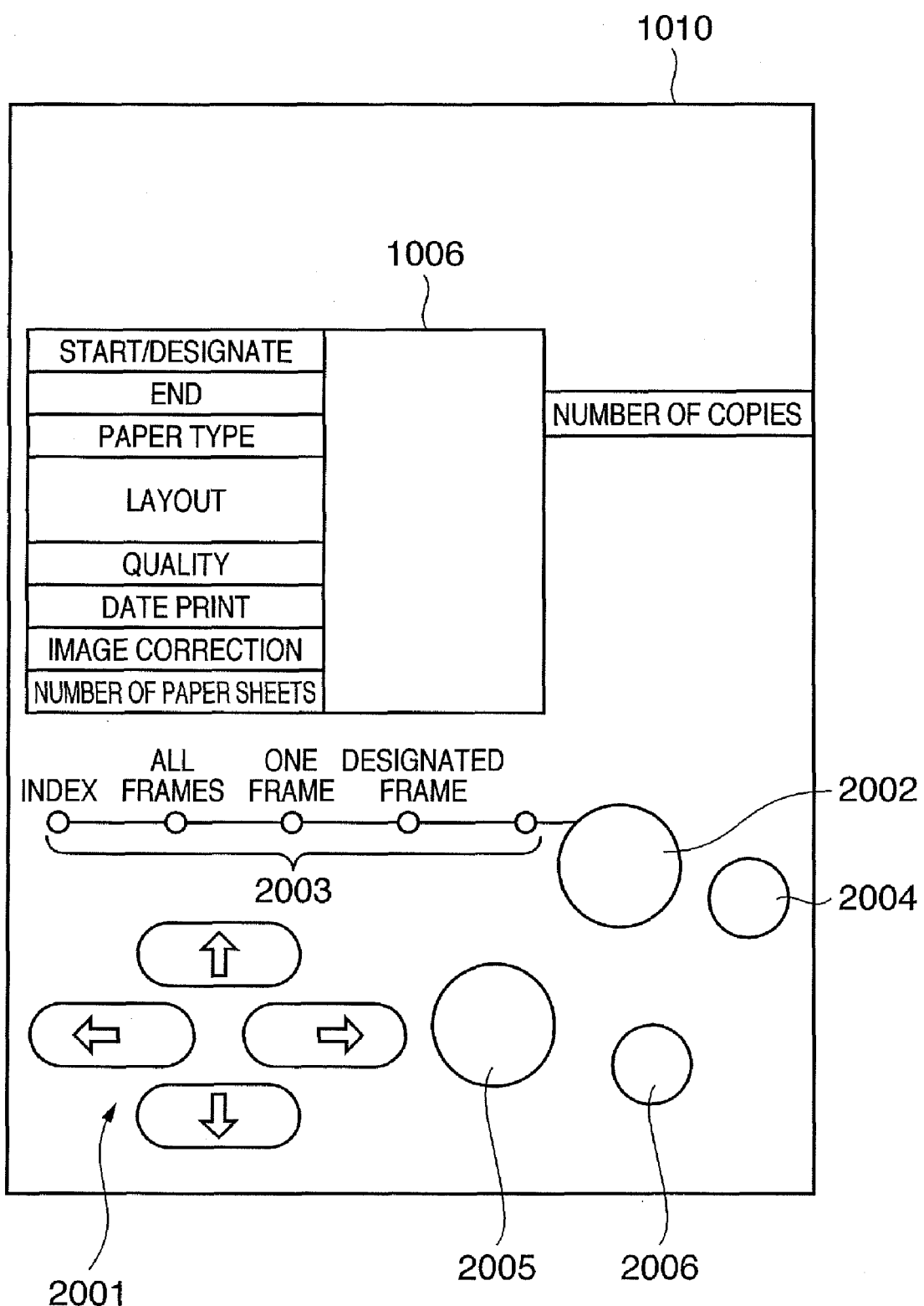
FIG. 2 depicts a schematic view showing the operation panel of the PD printer according to the embodiment.

FIG. 2 depicts a schematic view showing the operation panel 1010 of the PD printer 1000 according to the embodiment.

Referring to FIG. 2, the liquid crystal display unit 1006 displays menu items to set various data about items printed on its right and left sides. Examples of the displayed items are the number of the first photo image to be printed in a plurality of photo image files, the designated frame number (start frame designation/print frame designation), the number of the last photo image to be printed (end), the number of prints (number of copies), the type of sheets used for print (paper type), setting of the number of photos to be printed on one sheet (layout), designation of print quality (quality), designation of ON/OFF of image capturing date print (date print), designation of ON/OFF of photo correction print (image correction), and display of the number of paper sheets necessary for print (number of paper sheets) The user selects or designates these items by using cursor keys 2001. The user can switch the type of print (e.g., index print, all frame print, one frame print, and designated frame print) by pressing a mode key 2002. One of LEDs 2003 lights up in correspondence with the selected mode. A maintenance key 2004 is used for printer maintenance to, e.g., clean the printhead. The user presses a print start key 2005 to instruct the start of print or establish maintenance setting. The user presses a print stop key 2006 to stop print or instruct to stop maintenance.

The arrangement of the main part related to control of the PD printer 1000 according to the embodiment will be explained next with reference to FIG. 3. The same reference numerals as in the foregoing drawings denote the same parts in FIG. 3, and a description thereof will be omitted.

Figure 3:
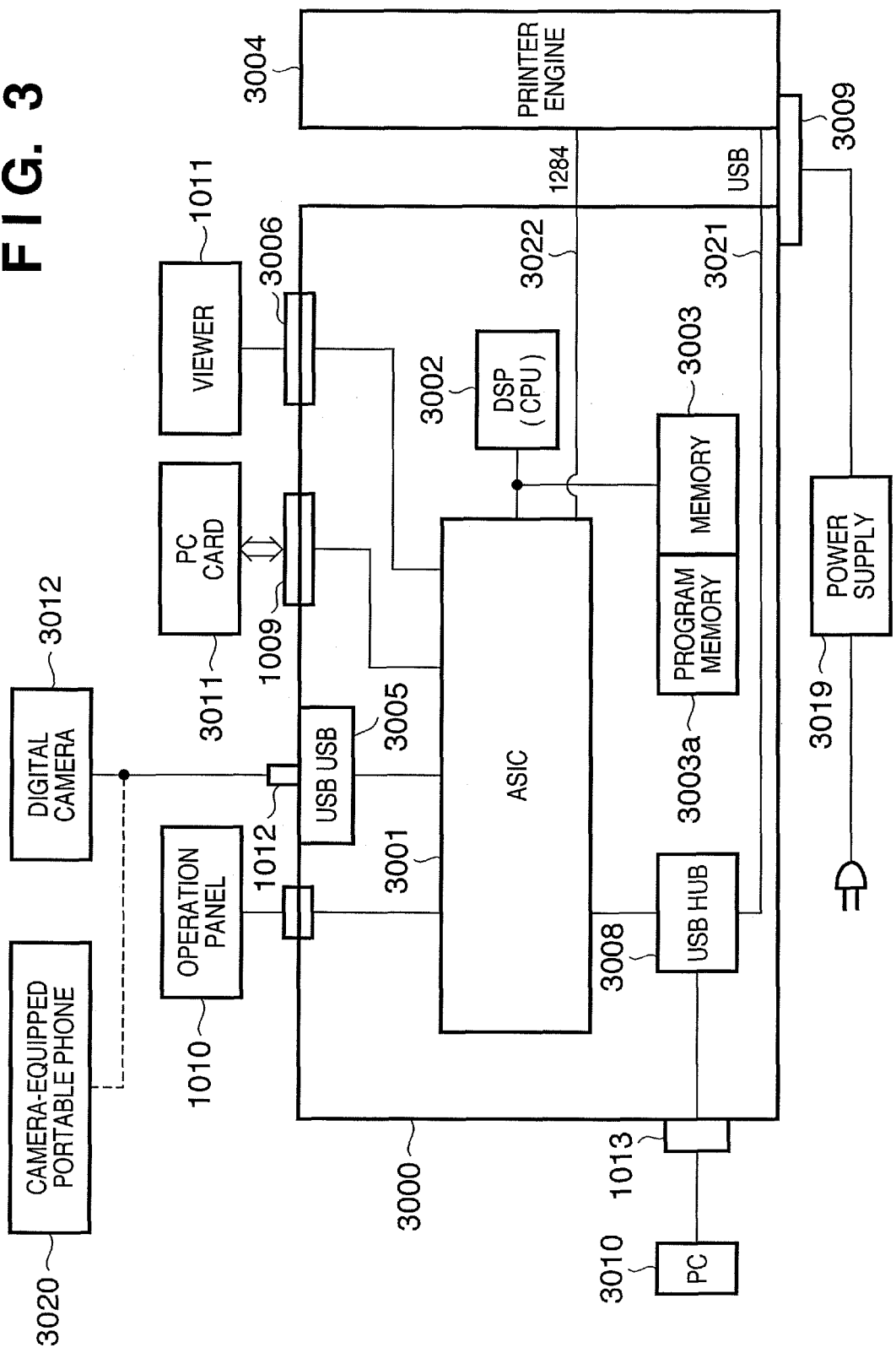
FIG. 3 is a block diagram showing the arrangement of the main part related to control of the PD printer according to the embodiment.

FIG. 3 is a block diagram showing the arrangement of the main part related to control of the PD printer according to the embodiment.

In FIG. 3, reference numeral 3000 denotes a controller (control board); and numeral 3001 denotes an ASIC (Application Specific Integrated Circuit). A DSP (Digital Signal Processor) 3002 incorporates a CPU and performs various kinds of control processes to be described later, and image processes such as conversion from a luminance signal (RGB) to a density signal (CMYK), scaling, gamma conversion, and error diffusion. A memory 3003 has a program memory 3003a to store the control program of the CPU of the DSP 3002, a RAM area to store programs in running, and a memory area functioning as a work memory to store, e.g., image data. A printer engine 3004 here includes an ink-jet printer engine that prints a color image by using a plurality of color inks. A SUB-USB 3005 serving as a port to connect a digital camera (DSC) 3012 has the connector 1012. The DSC 3012 or camera-equipped cellular phone connects to the connector 1012. A connector 3006 connects the viewer 1011. A USB hub (USBHUB) 3008 passes through data from a PC 3010 and outputs it to the printer engine 3004 via a USB 3021, in a case that the PD printer 1000 prints on the basis of image data from the PC 3010. The connected PC 3010 can directly exchange data and signals with the printer engine 3004 and execute print (functions as a general PC printer). A power connector 3009 receives, from a power supply 3019, a DC voltage converted from a commercial AC voltage. The PC 3010 is a general personal computer. Reference numeral 3011 denotes a memory card (PC card) described above, and numeral 3012 denotes the digital camera (DSC: Digital Still Camera).

Signal exchange between the controller 3000 and the printer engine 3004 is performed via the above-described USB 3021 or an IEEE1284 bus 3022.

Figure 4:
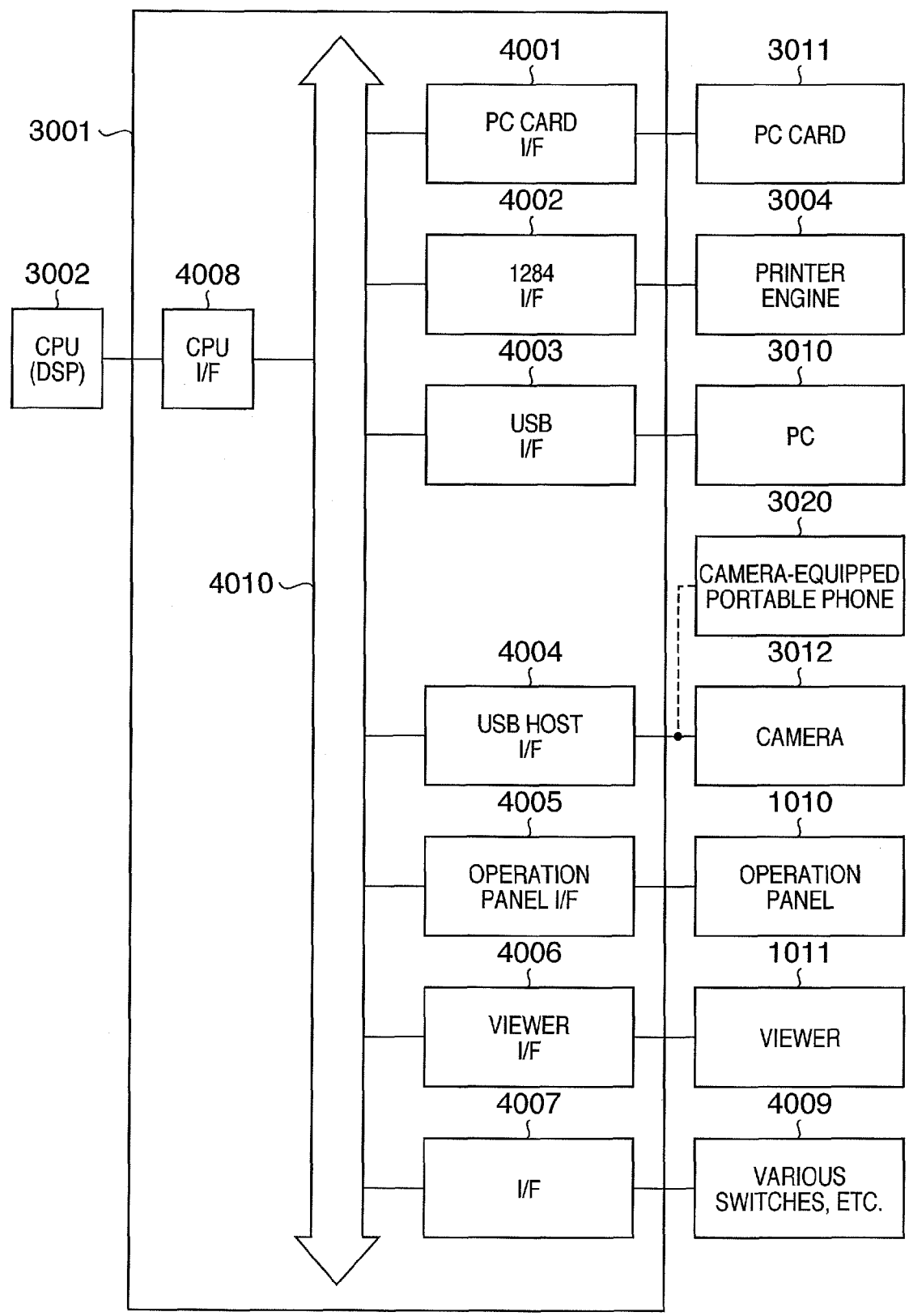
FIG. 4 is a block diagram showing the arrangement of an ASIC of the PD printer according to the embodiment.

FIG. 4 is a block diagram showing the arrangement of the ASIC 3001 of the PD printer 1000 according to the embodiment. The same reference numerals as in the foregoing drawings denote the same parts in FIG. 4, and a description thereof will be omitted.

A PC card interface 4001 reads image data stored in the mounted PC card 3011 or writes data in the PC card 3011. An IEEE1284 interface 4002 exchanges data with the printer engine 3004. The IEEE1284 interface 4002 is a bus used to print image data received from the DSC 3012 or a CP 3020 or stored in the PC card 3011. A USB interface 4003 exchanges data with the PC 3010. A USB host interface 4004 exchanges data with the connected DSC 3012 or CP 3020. An operation panel interface 4005 receives various operation signals from the operation panel 1010 or outputs display data to the display unit 1006. A viewer interface 4006 controls image data display on the viewer 1011. An interface 4007 controls an interface to various switches and LEDs 4009. A CPU interface 4008 controls data exchange with the DSP 3002. An internal bus (ASIC bus) 4010 connects these units.

Figure 5:
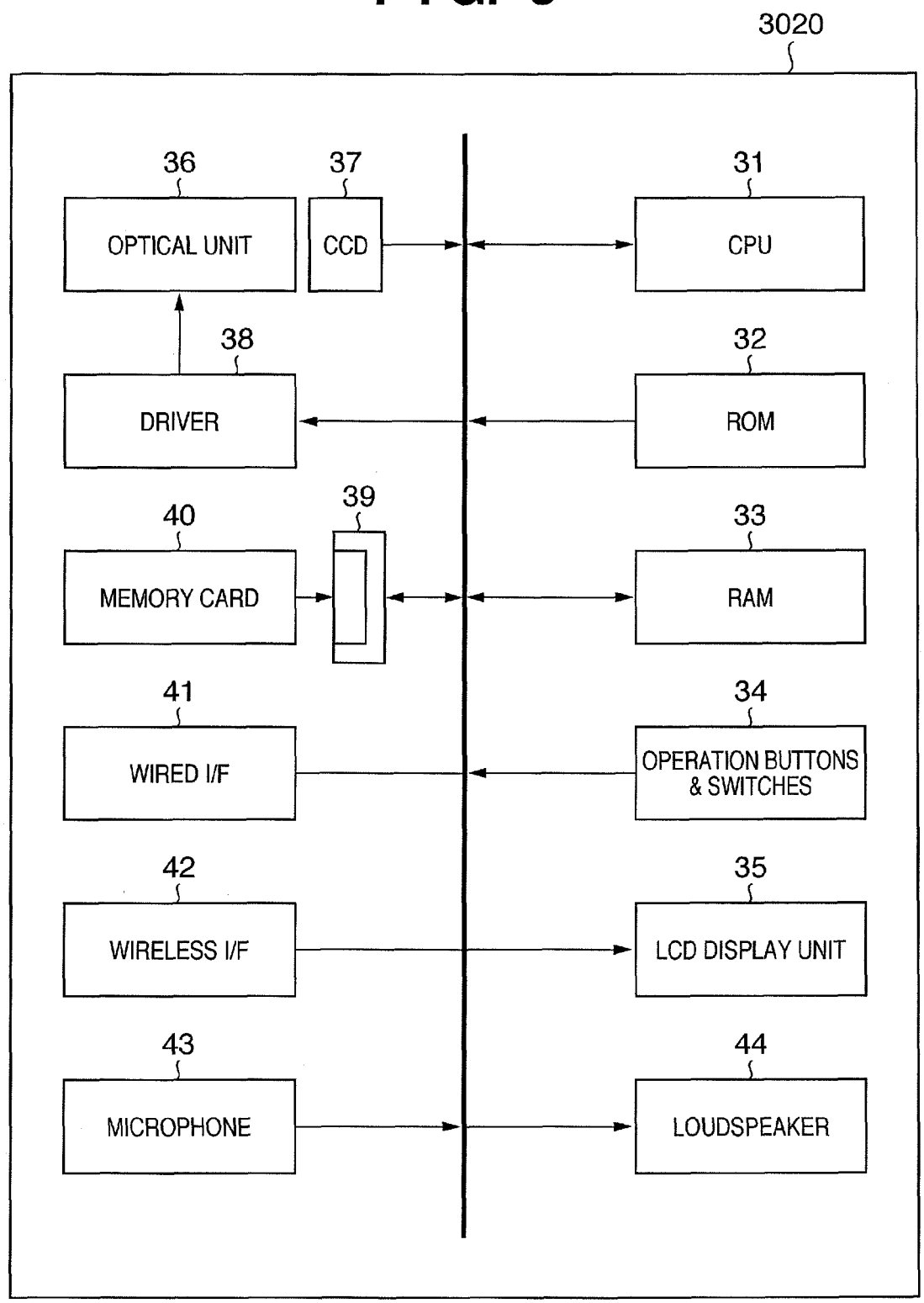
FIG. 5 is a block diagram showing the arrangement of a camera-equipped cellular phone (CP) according to the embodiment.

FIG. 5 is a block diagram showing the arrangement of the camera-equipped cellular phone (CP) 3020 according to the embodiment. The hardware of the camera-equipped cellular phone is well known and will be explained briefly.

Referring to FIG. 5, a CPU 31 controls the entire CP 3020 in accordance with a control program stored in a ROM 32. The ROM 32 stores programs that describe a process procedure (firmware) to be executed by the CPU 31 (the firmware assumes occasional upgrading and therefore includes a writable nonvolatile memory such as a flash memory). A RAM 33 serves as a work area upon the process executed by the CPU 33 and temporarily stores various kinds of data. Operation buttons and switches 34 include a ten-key pad used to input numbers and characters, a call key, and switches to instruct various functions. A liquid crystal display unit 35 is used to confirm, on the screen, an image taken by using the camera function or display menus for various kinds of settings. The operation buttons and switches 34 and display unit 35 function as a user interface for the whole direct print system implemented in this embodiment. An optical unit 36 mainly has a lens and its driving system. A CCD element 37 converts an image formed by the optical unit 36 into an electrical signal. A driver 38 executes auto focus control and aperture adjustment by controlling the optical unit 36 under the control of the CPU 31. A memory card 40 is a storage medium such as a compact Flash® memory card or smart media and connects to a bus via a connector 39. A wired interface 41 is a USB interface (slave side of USB) to connect the PC 3010 or PD printer 1000 according to the embodiment. A wireless interface 42 is used by the CP serving as a cellular phone to communicate with a base station. The user uses a microphone 43 and a loudspeaker 44 for speech communication by the phone.

The arrangements of the PD printer 1000 and CP 3020 according to the embodiment have been described above. An operation based on the above arrangements will be roughly described below.

<Normal PC Printer Mode>

This is a print mode to print an image based on print data sent from the PC 3010. In this mode, data input from the PC 3010 via a USB connector 1013 (FIG. 3) is directly sent to the printer engine 3004 via the USB hub 3008 and USB 3021. Print is done on the basis of the data from the PC 3010.

<Direct Print Mode From PC Card>

When the PC card 3011 is mounted or dismounted on the card slot 1009, an interrupt occurs. The DSP 3002 can detect that the user has attached or detached (removed) PC card 3011. If the PC card 3011 is attached, compressed (e.g., JPEG-compressed) image data stored in the PC card 3011 is read out and stored in the memory 3003. The compressed image data is decompressed and stored in the memory 3003 again. If the user instructs to print the stored image data by using the operation panel 1010, the image data undergoes conversion from an RGE signal into a YMCK signal, gamma correction, and error diffusion and changes to print data printable by the printer engine 3004. The print data is output to the printer engine 3004 via the IEEE1284 interface 4002 and printed.

<Direct Print Mode From Camera>

Figure 6:
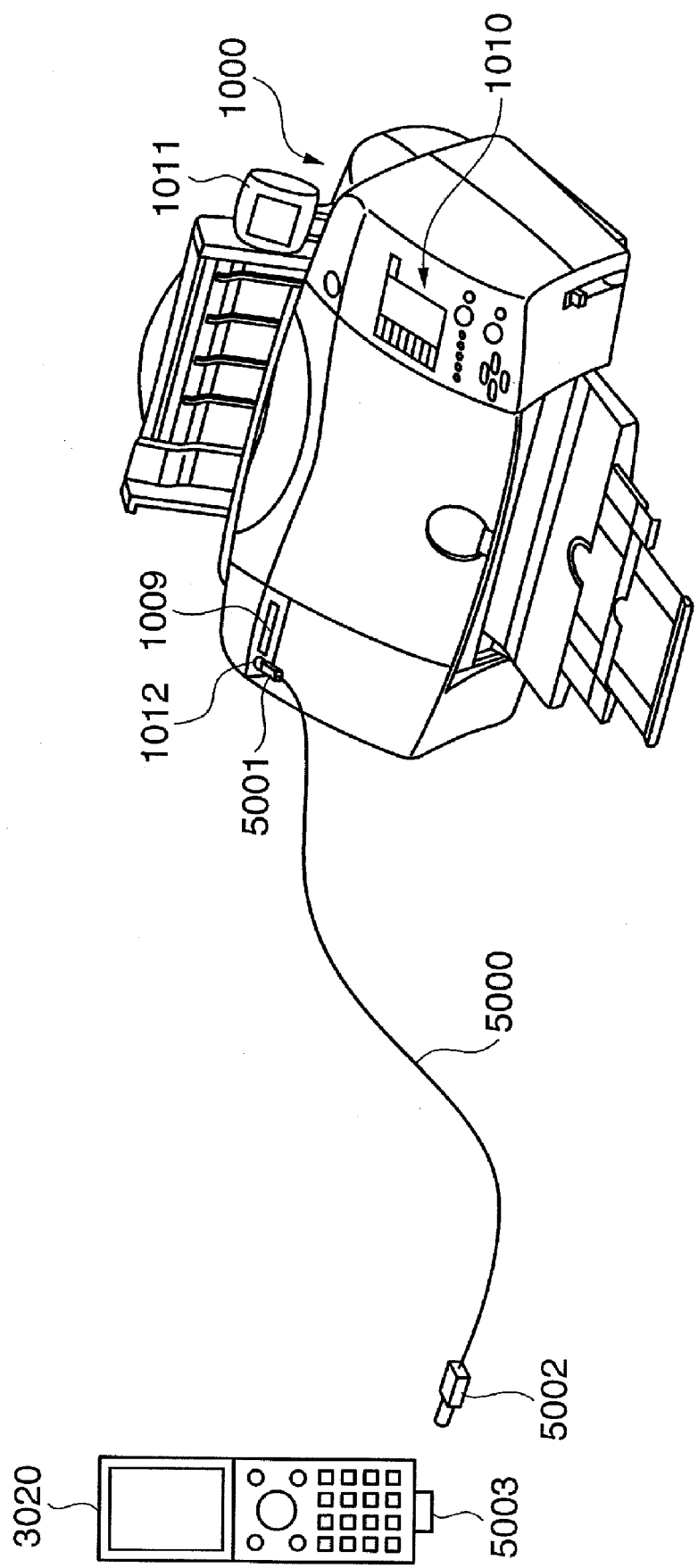
FIG. 6 depicts a view for explaining connection between a PD printer and a CP according to the embodiment.

FIG. 6 depicts a view for explaining connection between the PD printer 1000 and the CP 3020 according to the embodiment.

Referring to FIG. 6, a cable 5000 has a connector 5001 connected to the connector 1012 of the PD printer 1000, and a connector 5002 connected to a connector 5003 of the CP 3020. The CP 3020 can output, via the connector 5003, image data saved in, e.g., the memory card 40. The CP 3020 can employ various arrangements by, e.g., incorporating a memory serving as a storage means or providing a slot to receive a removable memory. When the PD printer 1000 connects to the CP 3020 via the cable 5000 in this way, the PD printer 1000 can directly print image data from the CP 3020. This embodiment includes not only such connection of the CP 3020 and PD printer 1000 via the cable but also a connection form for wireless communication using light such as infrared light.

Figure 7:
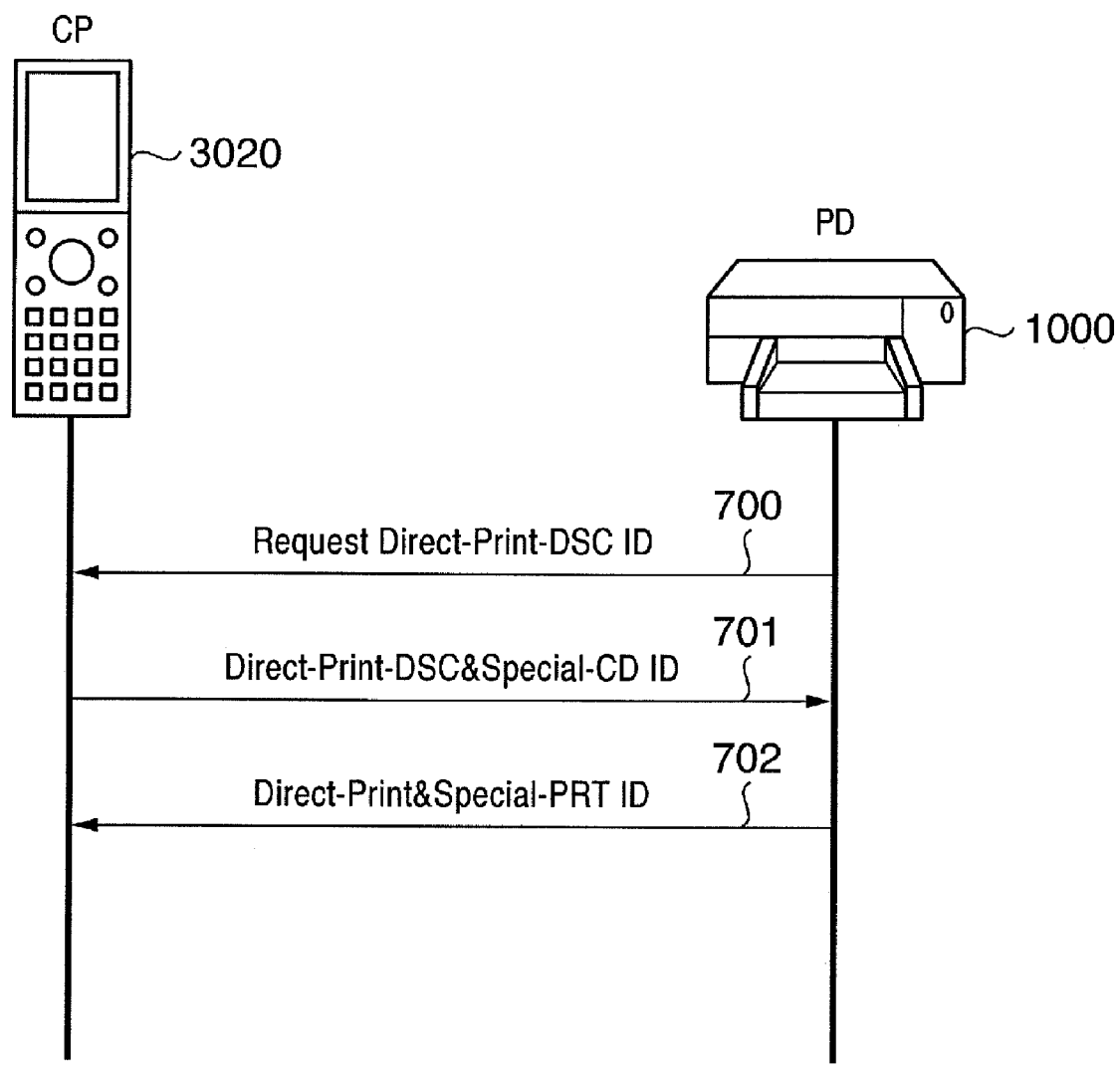
FIG. 7 depicts a view for explaining the outline of a communication procedure of causing the CP and PD printer according to the embodiment to recognize a direct print function and a cooperation function.

FIG. 7 depicts a view for explaining the outline of a communication procedure of causing the CP 3020 and PD printer 1000 according to the embodiment to recognize a direct print function and a cooperation function. The PD printer 1000 is a printer compatible with the direct print function and cooperation function. The CP 3020 is a camera-equipped cellular phone compatible with the direct print function and cooperation function. The cooperation function will be described later. The cooperation function includes, e.g., a process of providing date/time information held in the camera-equipped cellular phone 3020 to the PD printer 1000 to designate a timing of ink jet head recovery operation in the printer 1000 and a process of transmitting received mail held in the camera-equipped cellular phone 3020 or a phone directory or mail address registered in the camera-equipped cellular phone 3020 to the PD printer 1000 and printing the data.

In 700, the PD printer 1000 transmits a command "Request Direct-Print-DSC ID" to the CP 3020 to inquire whether it is a DSC compatible with the direct print function. The "Direct-Print-DSC ID" is data indicating a DSC compatible with the direct print function. The data contains "-DSC ID" because an existing communication interface to a digital camera is used, and the PD printer 1000 starts a process assuming that the connected partner is a digital camera. In 701, the CP 3020 embeds information (Special-CP ID) indicating a CP compatible with the cooperation function in the information containing "Direct-Print-DSC ID" and transmits the information to the PD printer 1000 in response to the request from it. The PD printer 1000 can recognize that the connected partner is a camera-equipped cellular phone (CP) compatible with the direct print function and cooperation function. In 702, the PD printer 1000 transmits, to the CP 3020, "Direct-Print-PRT ID" indicating a printer compatible with the direct print function and information (Special-PRT ID) indicating a printer compatible with the cooperation function. The CP 3020 recognizes that the PD printer 1000 of the partner is a printer compatible with the direct print function and cooperation function.

Assume that the PD printer 1000 receives information containing "Direct-Print-DSC ID" but no "Special-CP ID" in 701. In this case, the PD printer 1000 recognizes that the connected partner (CP 3020) is a DSC that is compatible with the direct print function but incompatible with the cooperation function.

Assume that the CP 3020 receives information containing "Direct-Print-PRT ID" but no "Special-PRT IDT" in 702. In this case, the CP 3020 recognizes that the connected partner (printer) is a printer that is compatible with the direct print function but incompatible with the cooperation function.

Figure 22:
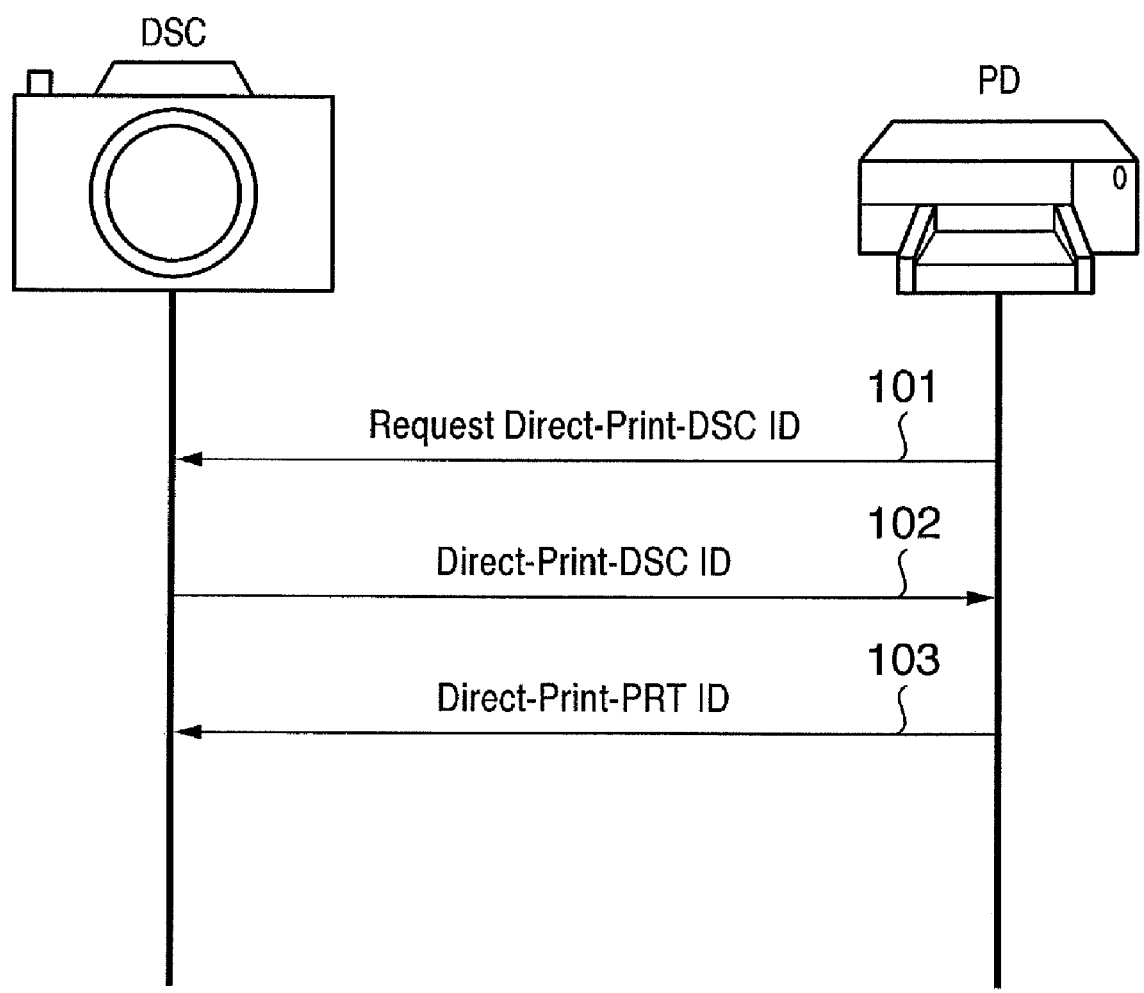
FIG. 22 depicts a view for explaining the outline of a direct print function recognition procedure between a DSC and a printer according to a prior art.
Figure 23:
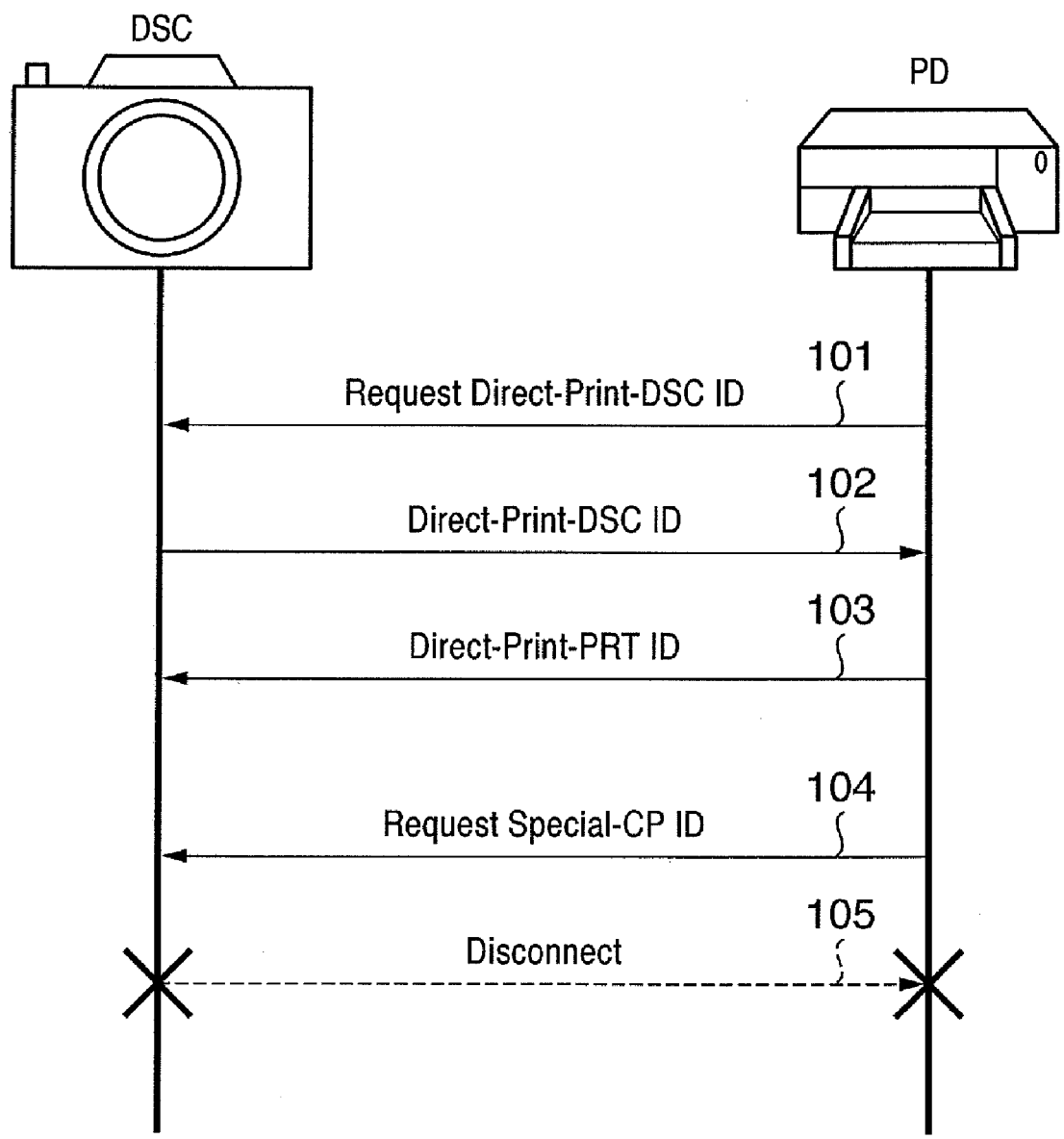
FIG. 23 depicts a view for explaining the outline of a cooperation function recognition procedure between a CP and a printer, in a case where the direct print function recognition method of the prior art is applied as it is to cooperation function recognition.
Figure 24:
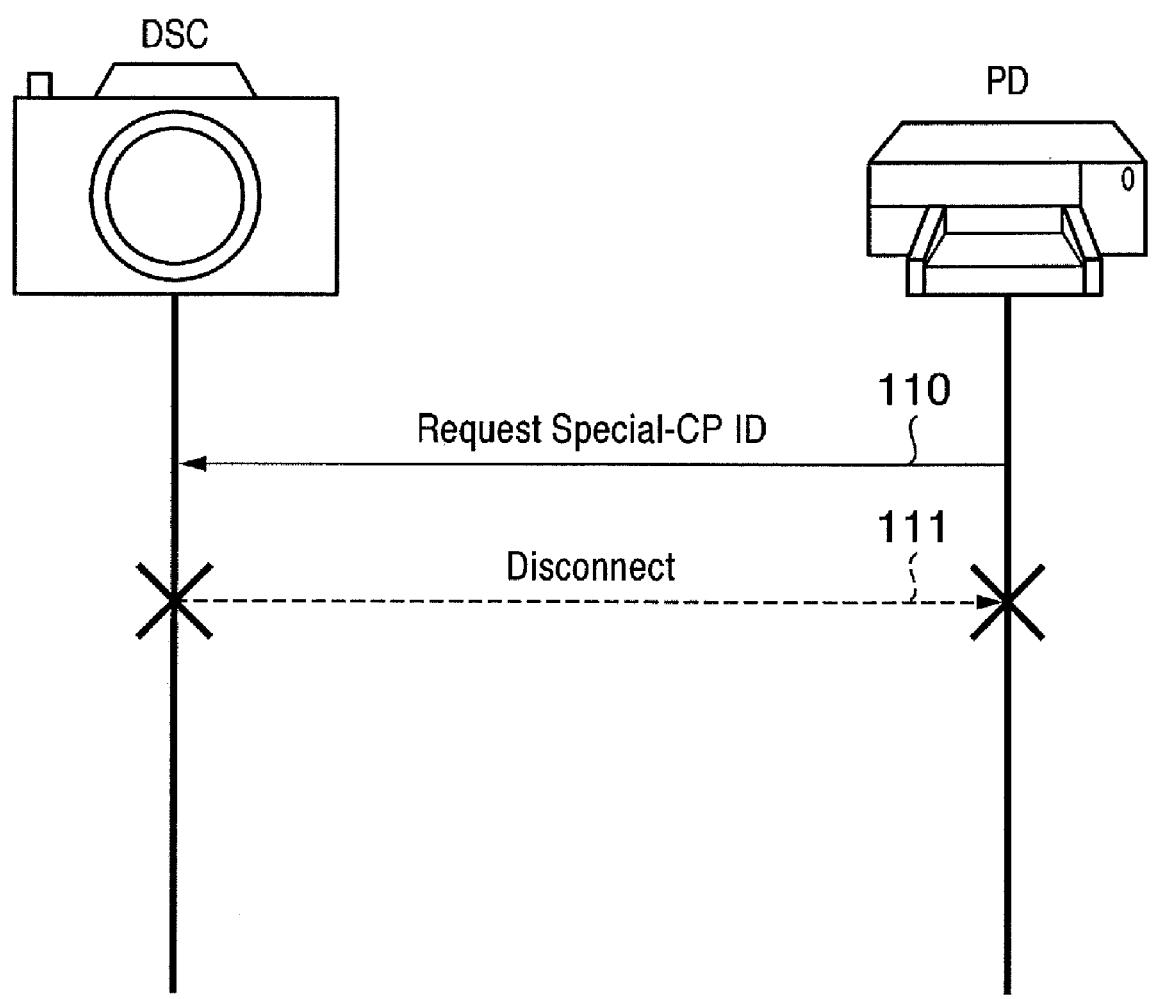
FIG. 24 depicts a view for explaining a problem that occurs upon direct print function recognition between a DSC and a printer, in a case where cooperation function recognition is executed between a CP and a printer by using the direct print function recognition method of the prior art.

The procedure when both connected partners are incompatible with the direct print function is the same as in FIG. 22 described above, and a description thereof will be omitted.

In the function recognition procedure between the DSC 3012 and the PD printer 1000 according to this embodiment, the PD printer 1000 transmits a command "Request Direct-Print-DSC ID" to the DSC 3012 in 101 to confirm whether the DSC is compatible with the direct print function, as shown in FIG. 22 described above. If the DSC 3012 is compatible with the direct print function, it returns "Direct-Print-DSC ID" (102). The PD printer 1000 can recognize that the connected partner is a DSC that is compatible with the direct print function but incompatible with the cooperation function. Next, the PD printer 1000 transmits, to the DSC 3012, information containing (Direct-Print-PRT ID) indicating a printer compatible with the direct print function (103). The DSC 3012 recognizes that the PD printer 1000 of the connected partner is a printer compatible with the direct print function. From then on, the normal direct print function is executable between the DSC 3012 and the PD printer 1000.

According to this embodiment, information containing direct print function confirmation data ("Direct-Print-PRT ID" or "Direct-Print-DSC ID") includes "embedded" or "added" data ("Special-PRT ID" or "Special-CP ID") to confirm the cooperation function. This allows the DSC and printer to mutually confirm whether they are compatible with the direct print function and cooperation function by the conventional communication procedure.

Figure 8A:
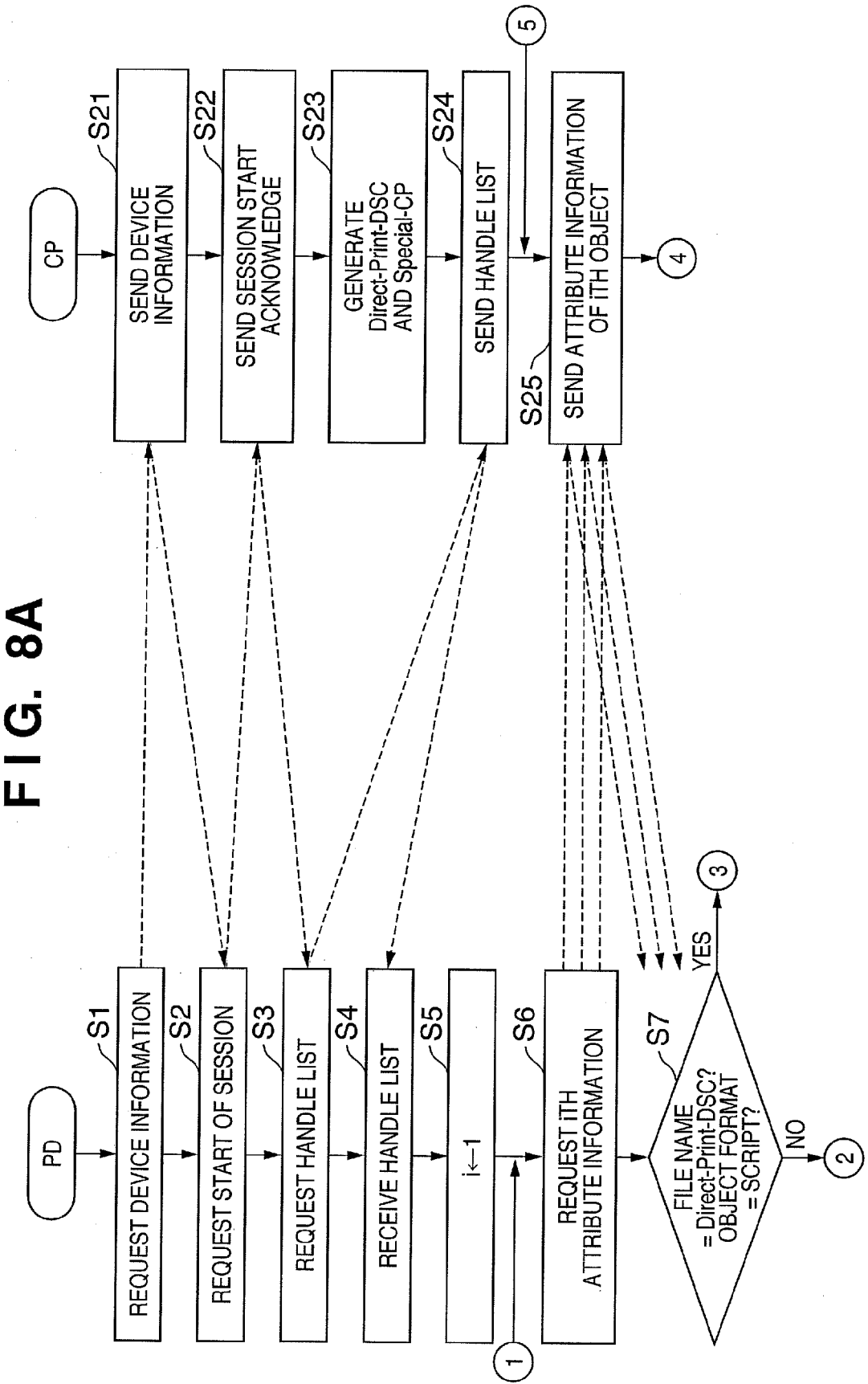
FIGS. 8A and 8B are flowcharts for explaining a procedure of causing the CP and PD printer according to the embodiment to recognize the direct print function and cooperation function.
Figure 8B:
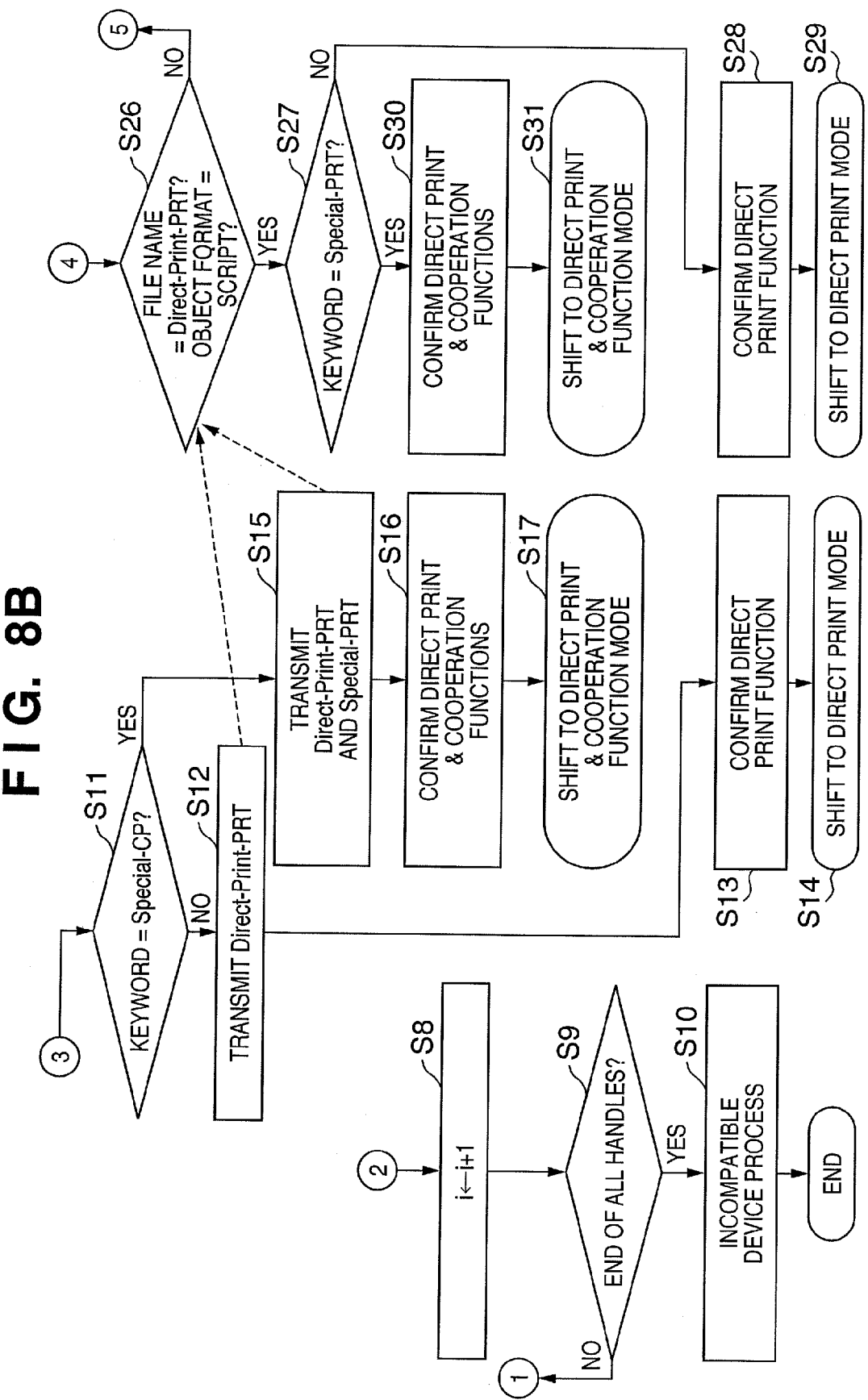

FIGS. 8A and 8B are flowcharts for explaining a procedure of causing the CP 3020 and PD printer 1000 according to the embodiment of the present invention to recognize the direct print function and cooperation function. In this embodiment, an example will be described in which a standard protocol PTP (Picture Transfer Protocol) defined by PIMA (Photographic and Imaging Manufacturers Association) is used for mutual communication between the CP 3020 and the PD printer 1000. This embodiment uses the PTP, though the present invention is not limited to this. The procedure may be implemented on, e.g., another interface or another class. In FIGS. 8A and 8B, steps S1 to S17 indicate processes by the PD printer 1000 while steps S21 to S31 indicate processes by the CP 3020.

In step S1, the PD printer 1000 transmits a device information request (GetDeviceInfo) to the CP 3020. In response to this request, the CP 3020 returns information (DeviceInfoDataset) indicating its device attribute to the PD printer 1000 in step S21. The information (DeviceInfoDataset) is attribute information about a camera defined by PTP and contains no information about the direct print function and cooperation function.

Upon receiving the device information (DeviceInfoDataset), the PD printer 1000 declares the start of a session by issuing (OpenSession) in step S2. Upon receiving this declaration, the CP 3020 returns session start acknowledge (OK) to the PD printer 1000 in step S22. In step S23, the CP 3020 generates, as attribute information (ObjectInfoDataset), function recognition information by embedding information (Direct-Print-DSC) indicating a DSC compatible with the direct print function and information (Special-CP) indicating a CP compatible with the cooperation function in object data to be transmitted to the PD printer 1000 in a step later.

Script type attribute information contained in Dataset of the general-purpose protocol (PTP) according to the embodiment will be described next with reference to FIGS. 9 to 12.

FIG. 9 depicts a view for explaining the data format of attribute information according to the embodiment. This data format is transmitted by "ObjectInfoDataset" defined by PTP.

This attribute information contains a plurality of information areas 901 to 912. Of pieces of information defined by attribute information (ObjectInfoDataset) defined by PTP, FIG. 9 shows only items related to recognition of the direct print function and cooperation function according to the embodiment.

The object format (ObjectFormat) 901 describes the format of the object (e.g., Jpeg, Tiff, text, XHTML, and script) by using an object code defined by the PTP specifications. The object size (ObjectCompressionSize) 902 describes the size of the object itself except the attribute information. The thumbnail format (ThumbFormat) 903 describes the format of the thumbnail image of the object by using an object code. The thumbnail size (ThumbCompressionSize) 904, thumbnail width (ThumbPixWidch) 905, and thumbnail height (ThumbPixHeight) 906 describe the size, width (the number of pixels), and height (the number of pixels) of the thumbnail images, respectively. The image width (ImagePixWidth) 907 and image height (ImagePixHeight) 908 describe the width (the number of pixels) and height (the number of pixels) of the image to be transmitted, respectively. The file name (Filename) 909 describes the file name of the object. The generation date/time (CaptureDate) 910 and modification date/time (ModificationDate) 911 respectively describe the generation date/time and the latest modification date/time of the object, respectively. The keyword (Keywords) 912 describes an arbitrary character string.

FIG. 10 depicts a view for explaining an example of attribute information generated by the DSC 3012 compatible with only the direct print function according to the embodiment. The structure of the attribute information is the same as that in FIG. 9 describe above.

The object format 901 describes an object code indicating "script". The object size 902 describes "0" to indicate that the object code has no entity. This is because the direct print function is recognized in this embodiment by exchanging attribute information but no object entity. The thumbnail format 903 describes "not available". All the thumbnail size 904, thumbnail width 905, thumbnail height 906, image width 907, and image height 908 describe "0". The file name 909 describes information (Direct-Print-DSC) indicating a DSC compatible with the direct print function. The generation date/time 910, modification date/time 911, and keyword 912 describe arbitrary dates/times and character string.

FIG. 11 depicts a view for explaining an example of attribute information generated by the PD printer compatible with only the direct print function according to the embodiment. The structure of this attribute information is also the same as that in FIG. 9 describe above. The attribute information contents shown in FIG. 11 are the same as those in FIG. 10 except the file name 909, and a description thereof will be omitted.

The file name 909 describes information (Direct-Print-PRT) indicating a printer compatible with the direct print function.

FIGS. 12A and 12B depicts views for explaining examples of attribute information compatible with the direct print function and cooperation function according to the embodiment. FIG. 12A shows an example of attribute information generated by the CP 3020 to indicate compatibility with the direct print function and cooperation function. FIG. 12B shows an example of attribute information generated by the PD printer 1000 to indicate compatibility with the direct print function and cooperation function. The structure of this attribute information is also the same as that in FIG. 9. As is apparent from comparison with FIG. 10, the attribute information contents shown in FIGS. 12A and 12B are the same as those in FIG. 10 except the keyword 912, and a description thereof will be omitted.

The keyword 912 in FIG. 12A embeds information (Special-CP) indicating a CP compatible with the cooperation function. The keyword 912 in FIG. 12B embeds information (Special-PRT) indicating the PD printer 1000 compatible with the cooperation function.

As described above, in step S23, the CP 3020 generates attribute information as shown in FIG. 12A, generates a virtual object having an object size "0" without any entity and corresponding to the generated attribute information, and assigns a handle to the generated virtual object.

In step S3, the PD printer 1000 transmits "GetObjectHandles" to the CP 3020 to request the handle list of objects held by the CP 3020. In step S24, the CP 3020 notifies the PD printer 1000 of the handle list (ObjectHandleArray) assigned to the objects (images and scripts) held in itself. The handle list includes the handle assigned to the virtual object corresponding to the attribute information containing the function recognition information generated in step S23 described above. In step S4, the PD printer 1000 receives the handle list.

The PD printer 1000 grasps the number of handles from the information received in step S4. In step S5, the PD printer 1000 substitutes an initial value "1" to a variable i indicating a handle. In step S6, the PD printer 1000 transmits GetObjectInfo (Handle i) to request attribute information corresponding to the ith object of the CP 3020. In response to the request from the PD printer 1000, the CP 3020 transmits the attribute information (ObjectInfo i Dataset) of the corresponding object to the PD printer 1000 in step S25.

In step S7, the PD printer 1000 receives the attribute information of the object and confirms the contents. In this case, the PD printer 1000 determines whether the file name 909 of the object corresponding to the value of the variable i is "Direct-Print-DSC", and the object format 901 is "script". If YES in step S7, the process advances to step S11. Otherwise, the process advances to step S8. The result of determination in step S7 is "YES" regardless of whether the received attribute information is the attribute information in FIG. 10 or attribute information in FIG. 12A. When the process advances to step S11, the PD printer 1000 recognizes that the device of the connected partner is compatible with at least the direct print function. In step S1, the PD printer 1000 determines whether "Special-CP" is embedded in the keyword 912 of the received attribute information. If YES (FIG. 12A) in step S11, the process advances to step S15. Otherwise, the process advances to step S12. In step S15, the PD printer 1000 recognizes that the CP 3020 of the connected partner is a camera-equipped cellular phone compatible with the direct print function and cooperation function. To notify the CP 3020 that the PD printer 1000 is compatible with the direct print and cooperation functions, the PD printer 1000 generates attribute information (ObjectInfoDataset) by embedding information (Special-PRT) indicating compatibility with the cooperation function in the keyword 912 of information containing information (Direct-Print-PRT) indicating compatibility with the direct print function, as shown in FIG. 12B, generates a virtual object having an object size "0" without any entity and corresponding to the generated attribute information, and transmits the attribute information of the generated virtual object to the CP 3020 (SendObjectInfo). In step S16, the PD printer 1000 determines that the direct print and cooperation functions are successfully confirmed. From then on, the PD printer 1000 shifts to the direct print & cooperation function mode (step S17). In step S12, to notify the device of the connected partner that the PD printer 1000 is compatible with the direct print function, the PD printer 1000 generates, as attribute information (ObjectInfoDataset) (FIG. 11), function recognition information containing information (Direct-Print-PRT) indicating compatibility with the direct print function. The PD printer 1000 generates a virtual object having an object size "0" without any entity and corresponding to the generated attribute information and transmits the attribute information to the CP 3020 (SendObjectInfo). Upon completing the transmission of the attribute information in step S12, the process advances to step S13. The PD printer 1000 determines that the direct print function is successfully confirmed. From then on, the PD printer 1000 shifts to the direct print mode (step S14).

If the result of determination in step S7 is "NO", i.e., if the file name 909 is not "Direct-Print-DSC", or the object format 901 indicates a format (e.g., a captured image) except "script", the variable i is incremented by one in step S9, and the process advances to step S9. In step S9, the PD printer 1000 determines whether the attributes of all handles are confirmed. If not every handle is checked, the process returns to step S6 to execute the above-described process. If every handle is checked, the process advances to step S10 to determine that the device of the connected partner is incompatible with the direct print function. To end the process, the PD printer 1000 executes an incompatible device process. For example, the LED provided on the operation panel 1010 is turned on to notify the error, or a message indicating that function confirmation has failed is displayed on the display unit 1006. Then, the process is completed.

In step S26, the CP 3020 receives the attribute information from the PD printer 1000 and confirms the contents. In this case, the CP 3020 determines whether the file name 909 of the attribute information is "Direct-Print-PRT", and the object format 901 is "script". If YES in step S26, the process advances to step S27. Otherwise, the process returns to step S25 to execute the above-described process. In step S27, the CP 3020 recognizes that the printer of the connected partner is compatible with at least the direct print function and determines whether "Special-PRT" is embedded in the keyword 912 of the attribute information. If "Special-PRT" is embedded, the process advances to step S30 to recognize that the PD printer 1000 of the connected partner is compatible with the direct print function and cooperation function. In step S31, the CP 3020 shifts to the direct print & cooperation function mode. If "Special-PRT" is not embedded in the keyword 912 in step S27, the process advances to step S28. The CP 3020 determines that the direct print function is successfully confirmed. From then on, the CP 3020 shifts to the direct print mode (step S29).

In the above-described example, information indicating compatibility with the cooperation function is embedded in the keyword 912 of attribute information. However, the embedding location is not particularly limited to the area of the keyword 912. The information indicating whether a device is compatible with the cooperation function can be embedded in any unused area where arbitrary information can be described in the information (attribute information (ObjectInfoDataset) on PTP of this embodiment) containing information indicating compatibility with the direct print function. Examples of such an area are the fields of the generation date/time 910 and modification date/time 911 in the attribute information on PTP of this embodiment.

In the above description, the PD printer 1000 transmits the attribute information shown in FIG. 11 in step S12. The PD printer 1000 also transmits attribute information with "Special-PRT" described in the keyword 912 in FIG. 11 in step S15. Fundamentally, the description contents of the keyword 912 in FIGS. 9 to 12B are arbitrary and not particularly limited to the above-described example.

In the above description, character strings indicating compatibility with the cooperation function are "Special-CP" and "Special-PRT". However, the character strings are not limited to these examples. The compatibility may be determined depending on whether the character string described in the keyword 912 contains the above-described character string.

Cooperation function version management has not been described above. Not only a character string indicating compatibility with the cooperation function but also its version information may be added to the keyword 912.

In the above description, "Special-PRT" indicating compatibility with the cooperation function is embedded in information containing "Direct-Print-PRT" serving as information indicating compatibility with the direct print function in 702 of FIG. 7. When 701 is ended, the PD printer 1000 recognizes that the device of the connected partner is compatible with the cooperation function. Hence, any means can be used after 702 to make the PD printer 1000 notify the CP 3020 that the PD printer 1000 is a device compatible with the cooperation function. For example, the PD printer may notify the CP first that the printer is compatible with the cooperation function and then that the model is compatible with the direct print function. The notification may be done in a reverse order. The means for notifying the CP of compatibility with the cooperation function may be different from the means for notifying the CP of compatibility with the direct print function (e.g., a delete/modification/acquisition/attribute information acquisition instruction is issued for an object corresponding to a secret handle that is shared by only devices compatible with the cooperation function and held by the CP 3020).

However, if the CP 3020 cannot determine whether the device of the connected partner is compatible with the cooperation function or whether the CP is connected to a PC, the following problems are posed.

If the behavior of a device compatible with the cooperation function is largely different from that of an incompatible device, the side of the CP 3020 must maintain a state to cope with both behaviors. This makes implementation difficult and unstable so device connection cannot be guaranteed.

Even if the cooperation function confirmation step is separately set, it is still necessary to confirm the direct print function. In any case, "Special-PRT" needs to be transmitted.

The process 702 in the above description properly solves these two problems in the following manner.

Independently of whether the device of the connected partner is compatible with the cooperation function, the information (attribute information (ObjectInfoDataset) on PTP of this embodiment) to be received by the CP 3020 is fixed. Hence, the operation stabilizes.

Simultaneously with transmission of "Direct-Print-PRT" to confirm the direct print function, "Special-PRT" to confirm the cooperation function can be transmitted.

In the above-described example, the functions are confirmed by exchanging attribute information. Instead of exchanging attribute information, the object main body may be transmitted (SendObject) and acquired (GetObject). Even when the functions are confirmed on the basis of information described in the object main body, the information indicating whether a device is compatible with the cooperation function can be embedded in any unused area or an area where arbitrary information can be described in the information indicating compatibility with the direct print function.

As described above, according to this embodiment, a device compatible with the direct print function and cooperation function can reliably and safely execute function confirmation with both a device compatible with only the direct print function and a device compatible with both functions.

If information indicating that a device is compatible with the cooperation function and information indicating that the model is compatible with the direct print function are separately transmitted in the process after 702 in the above description, it is preferable to transmit first the information indicating that the device is compatible with the cooperation function and then the information indicating that the model is compatible with the direct print function. If the information indicating that the model is compatible with the direct print function is transmitted first, the CP 3020 may execute both of a direct print function process actively done by it and a passive process of receiving the information indicating that the device is compatible with the cooperation function. If those processes are executed in order, timeout and the like must be set for the passive process. These factors occurs unstable state in connectivity.

However, if the information indicating that the device is compatible with the cooperation function is transmitted first, the CP 3020 can uniquely determine whether the device of the connected partner is compatible with the cooperation function depending on whether the information indicating that the device is compatible with the cooperation function is received first, or the information indicating that the model is compatible with the direct print function is received first in the process after 702.

Second Embodiment

In the second embodiment of the present invention, an example will be described in which a new function that is not incorporated in the direct print function is added as a cooperation function, thereby enhancing the direct print function. This cooperation function is a function of acquiring, from a CP, a current time used by a printer for, e.g., a printhead ink jet head recovery operation. The printhead ink jet head recovery operation is a known printhead maintenance means, and a description thereof will be omitted. How to make use of a current time for, e.g., the ink jet head recovery operation, has already been implemented as a function between a PC and a printer, and a description thereof will also be omitted.

PTP has date/time description areas such as the object "generation date/time" 910 and "modification date/time" 911 in the attribute information shown in FIG. 9. They are the generation (capturing) and modification dates/times of each object (e.g., photo). For this reason, it is not preferable to cause the printer to assume that the date/time indicates the current time and set the current time in the printer on the basis of the received date/time information. PTP defines no area to set the current date/time. It is therefore very difficult for the printer to safely and reliably acquire the current date/time on the basis of information in a specific area of attribute information managed on the CP. In the second embodiment, how to effectively use the cooperation function to achieve the object of safely and reliably acquiring current date/time information from the CP will be explained.

In the second embodiment, two cases will be described: a case wherein the printer determines the start of the ink jet head recovery operation while the CP does not instruct the printer to start the ink jet head recovery operation, and a case wherein the CP determines the start of the ink jet head recovery operation and instructs the printer to start the ink jet head recovery operation.

Figure 13B:
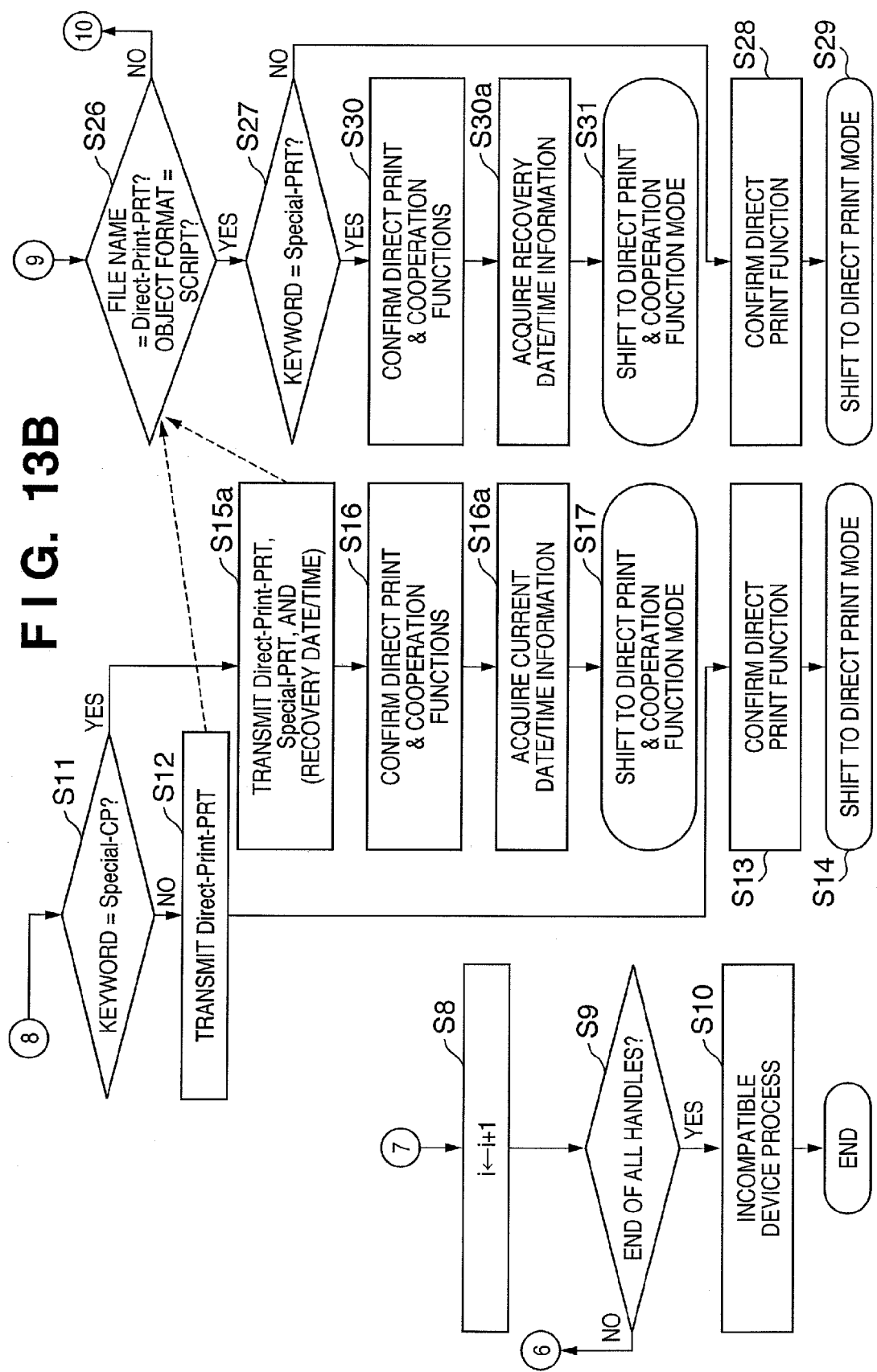

FIGS. 13A and 13B are flowcharts for explaining a procedure of causing a CP 3020 and a PD printer 1000 according to the second embodiment of the present invention to recognize the direct print function and cooperation function. The same step numbers as in the flowcharts of FIGS. 8A and 8B denote the same processes in FIGS. 13A and 13B, and a description thereof will be omitted. This process will be described assuming the case wherein the PD printer 1000 determines whether to start the ink jet head recovery operation while the CP 3020 does not instruct the PD printer 1000 to start the ink jet head recovery operation. The arrangements of the PD printer 1000 and CP 3020 according to the second embodiment are the same as in the above-described first embodiment, and a description thereof will be omitted.

In step S23*a*, the CP 3020 generates attribute information (ObjectInfoDataset) by embedding information (Special-CP) indicating a CP compatible with the cooperation function in attribute information containing information (Direct-Print-DSC) indicating a DSC compatible with the direct print function, as in step S23 of FIG. 8A. The CP 3020 also embeds information indicating the current date/time in the attribute information.

FIG. 14 depicts a view for explaining an example of attribute information generated by the CP 3020 compatible with the direct print function and cooperation function according to the second embodiment. The structure of the attribute information is the same as that in FIG. 9 described above. The contents of attribute information are the same as in FIGS. 12A and 12B except the contents of a modification date/time 911. The current date/time acquired from a timer function (not shown) incorporated in the CP 3020 is embedded in the modification date/time 911. The CP 3020 sends the embedded information (current date/time) to the PD printer 1000 in step S25.

In step S16*a*, the PD printer 1000 analyzes the received attribute information and acquires the current date/time from the modification date/time 911. The current date/time is made available for, e.g., determining the start of the ink jet head recovery operation executed by the PD printer 1000. In step S17, the PD printer 1000 shifts to the direct print & cooperation function mode.

In the direct print function mode, even when the modification date/time 911 describes the current date/time, there is no guarantee that the information is the current date/time acquired by the timer function provided in the device connected to the PD printer 1000. Hence, the information is not used for, e.g., determining the start of the ink jet head recovery operation executed by the PD printer 1000.

The case wherein the PD printer 1000 starts the ink jet head recovery operation on the basis of an instruction from the CP 3020 will be described next.

In step S15*a*, the PD printer 1000 generates attribute information (ObjectInfoDataset) containing information (Direct-Print-PRT) indicating that the printer is compatible with the direct print function and information (Special-PRT) indicating that the printer is compatible with the cooperation function, as in step S15 of FIG. 8B. The PD printer 1000 also embeds information indicating the current date/time in the attribute information.

FIG. 15 depicts a view for explaining an example of attribute information according to the second embodiment. The structure of the attribute information is also the same as that in FIG. 9.

In this case, the latest recovery date/time recorded in a nonvolatile memory (not shown) incorporated in the PD printer 1000 is embedded in the modification date/time 911 as "recover date/time". The PD printer 1000 sends the embedded information to the CP 3020 in step S26. In step S30*a*, the CP 3020 analyzes the received attribute information and acquires the recovery date/time from the description of the modification date/time 911. The recovery date/time is made available for the CP 3020 to, e.g., determine the start of the ink jet head recovery operation executed by the PD printer 1000. In step S31, the CP 3020 shifts to the direct print & cooperation function mode.

In the direct print function mode (steps S28 and S29), there is no guarantee that the "recovery date/time" described in the modification date/time 911 equals to the recovery date/time recorded in a nonvolatile memory of the device of the connected partner. Hence, the information is not used by the CP 3020 to, e.g., determine the start of the ink jet head recovery operation.

Figure 16:
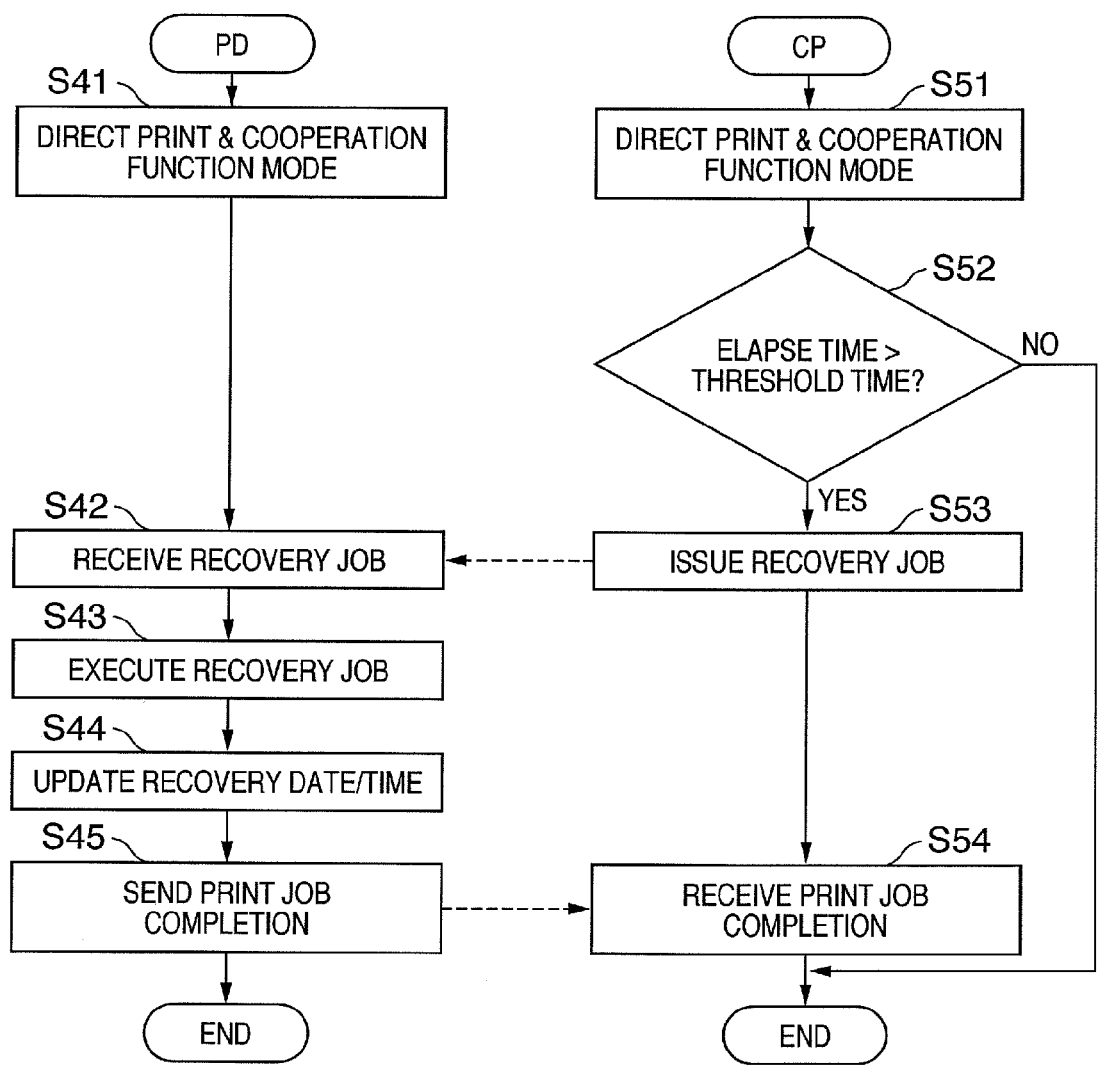
FIG. 16 is a flowchart for explaining a procedure of instructing an ink jet head as an example of the cooperation function between the CP and the PD printer according to the second embodiment of the present invention.

FIG. 16 is a flowchart for explaining a procedure of instructing the ink jet head recovery operation as an example of the cooperation function between the CP 3020 and the PD printer 1000 according to the second embodiment of the present invention. Steps S41 to S45 indicate processes by the PD printer 1000 while steps S51 to S54 indicate processes by the CP 3020. The CP 3020 has already acquired the recovery date/time in step S30a of FIG. 13B before the start of this process. In steps S41 and S51, the CP 3020 and PD printer 1000 operate in the direct print & cooperation function mode.

In step S52, the CP 3020 calculates the elapsed time from a recovery process recently executed by the PD printer 1000 by subtracting the recovery date/time acquired from the PD printer 1000 on the basis of the attribute information in FIG. 15 from the current date/time acquired by the internal timer function (not shown). The CP 3020 determines whether the elapsed time exceeds the threshold time to require the ink jet head recovery operation by the PD printer 1000. If the elapsed time exceeds the threshold time, the process advances to step S53 to issue a recovery process job to instruct the PD printer 1000 to start the recovery process. If the elapsed time does not exceed the threshold time, the process is terminated.

In step S42, the PD printer 1000 receives the recovery process job. The process advances to step S43 to execute the recovery process job. In this process, the printhead (ink-jet head) is moved to the recovery position, and the ink discharge performance of the head is recovered by sucking or forcibly discharging ink. When the recovery process is ended, the process advances to step S44 to store the recovery process execution date/time in a nonvolatile memory (not shown) incorporated in the PD printer 1000. In step S45, the PD printer 1000 sends, to the CP 3020, "recovery job completion" indicating the end of recovery process, thereby ending the process. When the CP 3020 receives the "recovery job completion" in step S54, the process by the CP 3020 is ended.

As described above, according to the second embodiment, a new function that is not incorporated in the direct print function is added as the cooperation function, thereby safely and reliably enhancing the direct print function. Even when connecting a device incompatible with the cooperation function, the new function can be added without any operation error.

In the above-described second embodiment, the current date/time information is embedded in the "modification date/time" 911 of attribute information. However, the current date/time transmission method in the cooperation function is not limited to this. A "generation date/time" 910 may be used. Alternatively, the date/time information may be added to a "keyword" 912. The area is not limited to the area in the attribute information to be used to confirm the direct print and cooperation functions. The attribute information of another object (e.g., photo image) may be used. That is, the cooperation function is set to transmit the current date/time by using a specific area that has no influence on/from the area used in the direct print function so that two devices can confirm each other's compatibility with the cooperation function.

In this embodiment, current date/time transmission has been exemplified as the new function that is not incorporated in the direct print function. However, the present invention is not limited to this. Any other information such as the types/sizes of fonts, the reception buffer size, and the maximum processible number of pixels on the printer side, and the types/sizes of fonts and the size of the liquid crystal display mounted on the CP side can be transmitted.

In the other example described above, upon receiving the types/sizes of fonts installed in the printer, the CP inhibits issue of a print job for a text file that is described in a font of type/size that is not installed in the printer and clearly notifies the user of it. This prevents any output of, e.g., a garbage text unexpected by the user.

In the other example described above, upon receiving the size of the reception buffer incorporated in the printer, the CP executes resize to make the print target image file equal to or smaller than the reception buffer size of the printer and issues a print job. This decreases the number of times of image transfer to the printer.

In the other example described above, if the CP is notified of the maximum number of pixels processible by the printer, and if the print target image file is larger than the maximum number of pixels processible by the printer, then the CP executes resize to make the file size equal to or smaller than the maximum processible number of pixels and issues a print job based on the resized file. This prevents any print failure in the printer.

In the other example described above, upon receiving the types/sizes of fonts and the size of the liquid crystal display mounted on the CP, the printer estimates the display layout on the liquid crystal display of the CP and prints in executing a text file print job. This prevents any print result unexpected by the user, including a difference between the layout and the print result.

In this embodiment, the CP and printer bidirectionally transmit information indicating compatibility with the cooperation function. This is the best case to exhibit the effect of the present invention as much as possible and implement the cooperation function most safely and reliably.

Actually, in transmitting the information indicating compatibility with the cooperation function from the CP to the printer and from the printer to the CP, the effect of the present invention can be obtained partially even by transmitting the information from one side to another. For example, when only the function of transmitting the current date/time from the CP to the printer and making the printer determine the start of the ink jet head recovery operation is to be implemented as the cooperation function, transmission of the information indicating compatibility with the cooperation function from the printer to the CP may be omitted. In this case, however, the CP cannot determine whether the printer correctly acquires the current date/time and starts the ink jet head recovery operation.

Third Embodiment

In the third embodiment of the present invention, an example will be described in which a CP and a printer share, as a cooperation function, the actual operation method of a function incorporated in the direct print function, thereby enhancing the direct print function. The arrangements of a PD printer 1000 and a CP 3020 according to the third embodiment are the same as in the above-described first embodiment, and a description thereof will be omitted.

In the third embodiment, a layout print function of causing the PD printer 1000 to print, in one page, a plurality of images designated from the CP 3020 will be explained. An effective operation of such layout print will be described by exemplifying a case wherein a plurality of images with designated transmittances are composited and printed as one composite image. A detailed example is a frame print function of superimposing an image of, e.g., a frame on a photo and printing them.

In the third embodiment, the printer, DSC, and CP exchange function information that indicates the number of photos printable in one page as the direct print function. The printer can arbitrarily set the layout positions and sizes of the plurality of photos printed in one page. The printer can form a composite image by laying out the plurality of images with designated transmittances at the same position or in the same size. That is, the direct print function potentially includes the composite print function itself in principle.

However, if the printer, DSC, and CP do not exchange function information indicating layout positions and sizes in the printer, the following problems occur in the direct print function. Assume that the CP issues print jobs of a plurality of images with designated transmittances to the printer of the connected partner. The CP does not know whether the printer is a printer capable of compositing the print jobs and printing them as one composite image or a printer that separately prints the images. Hence, the CP may be unable to provide the function explicitly presented to the user. Conversely, assume that the printer can composite print jobs of a plurality of images with designated transmittances and print them as one composite image. In this case, it is unknown whether the CP of the connected partner has issued the print jobs expecting that the printer should composite the plurality of images and print them as one image or expecting that the printer should separately print the images. Hence, it may be impossible to provide the print function explicitly presented to the user on the CP. That is, it is sometimes impossible to safely and reliably operate the function included in the direct print function.

In the third embodiment, how to effectively use the cooperation function to achieve the object of safely and reliably operating the function will be explained. A procedure of causing the printer to determine whether the cooperation function can properly be practiced between the CP and the printer and a procedure of causing the CP to determine whether the cooperation function can properly be practiced between the CP and the printer will be described with reference to FIGS. 17 and 18.

Figure 17:
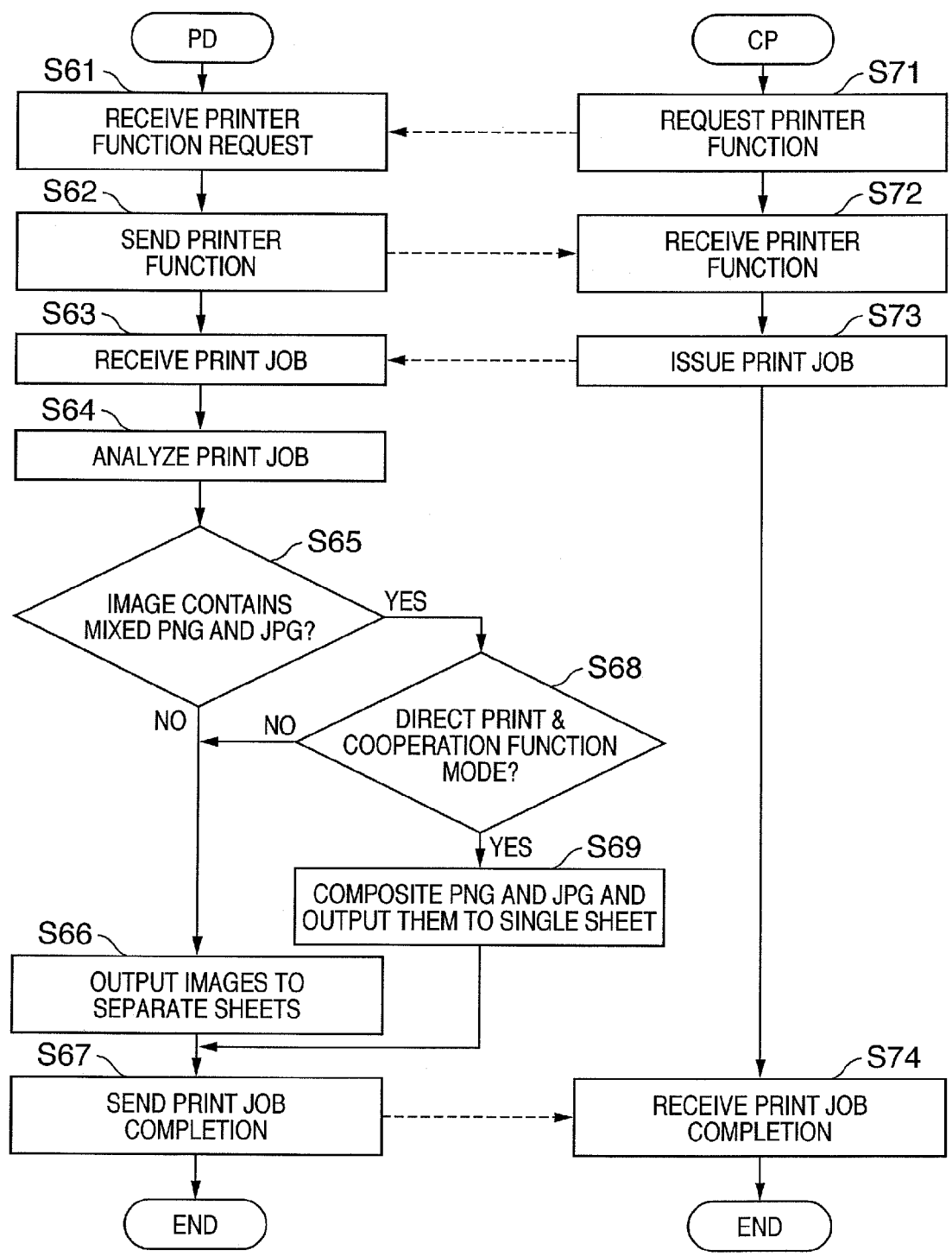
FIG. 17 is a flowchart for explaining an example of a procedure of a cooperation function between a CP and a PD printer according to the third embodiment of the present invention.

FIG. 17 is a flowchart for explaining an example of a procedure of the cooperation function between the CP 3020 and the PD printer 1000 according to the third embodiment of the present invention. In FIG. 17, steps S61 to S69 indicate processes by the PD printer 1000 while steps S71 to S74 indicate processes by the CP 3020.

The CP 3020 and PD printer 1000 are compatible with the direct print and cooperation functions. The CP 3020 and PD printer 1000 have already completed the direct print & cooperation function confirmation in FIGS. 8A and 8B and confirmed that each other's compatibility with the direct print and cooperation functions. An image, i.e., frame image whose transmittance is designated for image composition is a PNG format image. An original image to be composited with the PNG format image is a JPG format image. For a printer compatible with the direct print and cooperation functions and capable of printing a PNG format image and a JPG format image, the cooperation function is always set to composite print jobs including the mixed PNG and JPG format images and print them.

In step S71, the CP 3020 requests function information (Capability) of the PD printer 1000. This function information contains function information indicating the number of photos printable in one page and the formats of images printable by the PD printer 1000. The PD printer 1000 receives this request in step S61 and notifies the CP 3020 of Capability in step S62. This Capability includes PNG and JPG as the formats printable by the PD printer 1000. The CP 3020 displays, e.g., a UI corresponding to the acquired Capability of the PD printer 1000, makes a user select print target images, and issues a print job (step S73). To execute composite print, the CP 3020 issues a print job including the PNG and JPG image formats mixed to the PD printer 1000 in step S73. The PD printer 1000 receives the print job in step S63 and analyzes the print job in step S64.

In step S65, the PD printer determines whether images contained in the print job include mixed images with the extensions "PNG" and "JPG". If the images are not mixed, the process advances to step S66 to print the images on separate sheets in accordance with the designated format. When the images designated by the print job have been printed, the process advances to step S67 to notify the CP 3020 of the end of the print job. The CP 3020 confirms the end of the print job and terminates the process.

If images with the extensions "PNG" and "JPG" are mixed in step S65, the process advances to step S68 to determine whether the operation is being performed in the direct print & cooperation function mode. If the operation is being performed in the direct print & cooperation function mode, the process advances to step S69 to superimpose an image with the extension "PNG" on an image with the extension "JPG" and print them on a single sheet. An image with the extension "PNG" is an image in which a predetermined color region or a region is transparent. An image with the extension "JPG" is, e.g., a photo of a person or animal and the like. If the image with the extension "PNG" indicates a frame, a photo image containing a photo of a person or animal in the frame is printed in step S69.

If NO in step S68, the process advances to step S66. If both the PD printer 1000 and CP 3020 are compatible with the direct print and cooperation functions, the process does not advance from step S68 to step S66. However, if the device of the connected partner is not the CP 3020 according to this embodiment but a device compatible with the direct print function and incompatible with the cooperation function, the condition advances the process to step S66. In this case, the PD printer 1000 prints the PNG and JPG images on separate sheets. Since YES in step S65 and NO in step S68, the PD printer 1000 recognizes that the CP 3020 of the connected partner is incompatible with the cooperation function. Hence, the PD printer 1000 can determine that the device of the connected partner has not issued the print job including the mixed PNG and JPG images in step S73, clearly expecting that the printer should composite the PNG and JPG images and output each of them to a single sheet. Hence, by printing the PNG and JPG images on separate sheets in step S66, the PD printer can properly provide the function explicitly presented to the user on the device of the connected partner.

As described above, according to the third embodiment, frame print can be done as an example of the cooperation function.

Fourth Embodiment

Figure 18:
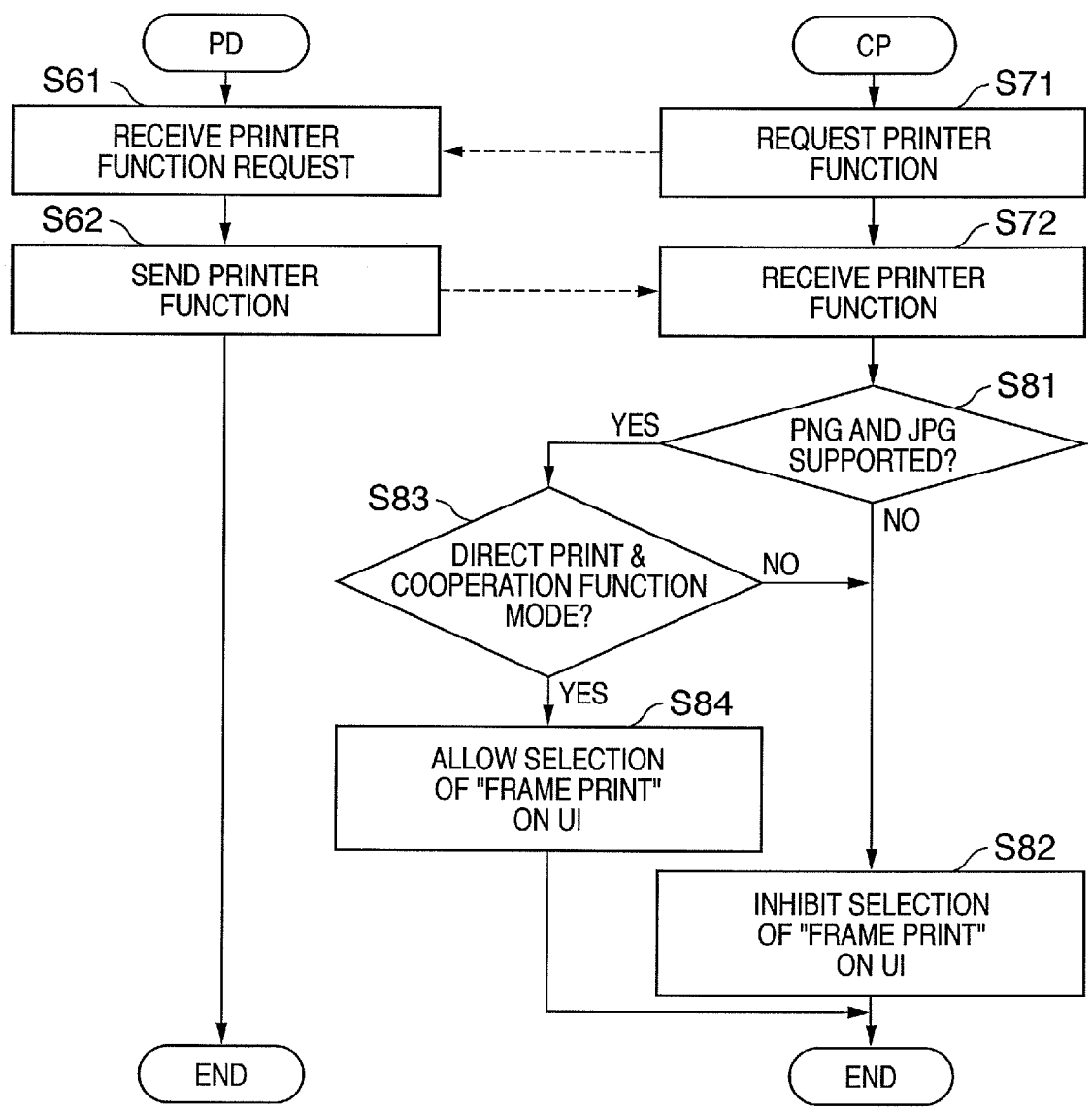
FIG. 18 is a flowchart for explaining an implementation example of a cooperation function between a CP and a PD printer according to the fourth embodiment of the present invention.

FIG. 18 is a flowchart for explaining an implementation example of a cooperation function between a CP 3020 and a PD printer 1000 according to the fourth embodiment of the present invention. The same step numbers as in FIG. 17 described above denote the same processes in FIG. 18, and a description thereof will be omitted. The arrangements of the PD printer 1000 and CP 3020 according to the fourth embodiment are the same as in the above-described first embodiment, and a description thereof will be omitted.

In step S72, the CP 3020 receives Capability from the PD printer 1000. The process advances to step S81 to determine whether the PD printer 1000 supports print of images with extensions "PNG" and "JPG". If the PD printer 1000 does not support the formats, the process advances to step S82 to inhibit selection of "frame print" on the UI displayed on a display unit 35 of the CP 3020. If the PD printer 1000 supports images with the extensions "PNG" and "JPG", the process advances to step S83 to determine whether the operation is being performed in the direct print & cooperation function mode. If YES in step S83, the process advances to step S84 to display "frame print" in a selectable form in the UI on the display unit 35.

If the user selects "frame print" on the UI of the CP 3020, the CP 3020 issues a print job including mixed PNG and JPG images. Since it is already determined in step S84 that the PD printer 1000 is compatible with the direct print and cooperation functions and capable of printing the PNG and JPG formats, the CP 3020 can determine that the PD printer 1000 can composite PNG and JPG images and print them.

If the user of the CP 3020 does not select "frame print" on the UI, the CP 3020 does not issue a print job including mixed PNG and JPG images. This is because the CP 3020 can determine that the user who has selected "non-frame print" is expecting that the printer should separately print the images. In this case, if the CP 3020 issues a print job including mixed PNG and JPG images to a printer compatible with the direct print and cooperation function, then the PD printer 1000 executes composite print. Hence, the printer cannot properly provide the function explicitly presented to the user.

In this way, the CP 3020 can issue a print job to designate "frame print" using images with the extensions "PNG" and "JPG". The CP 3020 sends the updated and generated print job to the PD printer 1000 in step S73 of FIG. 17 so that the printer executes the frame print intended by the user of the CP 3020.

As described above, according to this embodiment, it is possible to safely, reliably, and more effectively operate the cooperation function according to the direct print function. Even when a device incompatible with the cooperation function is connected, the direct print function can be operated without any operation error.

In the above-described example, a PNG image is used as the frame image, and a JPG image is used as the main image. However, the method of implementing frame print as the cooperation function is not limited to this. The frame image may use any other image format such as GIF. The main image may use any other image format such as TIFF.

In the above-described example, one image is laid out in each page and printed. That is, in the non-frame print mode, PNG and JPG images are printed on separate sheets. For example, if a plurality of images are laid out in each page and printed in the non-frame print mode, PNG and JPG images which are not composited are separately printed in a single page.

In FIG. 17, at first, it is determined whether the print job includes mixed PNG and JPG images. After then, the direct print & cooperation function mode is determined. However, the present invention is not limited to this determination order and timings. The determination may be done in, e.g., a reverse order. Different procedures may be employed in the direct print & cooperation function mode and in the direct print mode.

In FIG. 18 as well, at first, it is determined whether the PD printer 1000 can print PNG and JPG images. After then, the direct print & cooperation function mode is determined. However, the present invention is not limited to this determination order and timings. The determination may be done in, e.g., a reverse order. Different procedures may be employed in the direct print & cooperation function mode and in the direct print mode. That is, the cooperation function is set to clearly determine whether the device of the connected partner has issued the print job expecting frame composite, and the two devices confirm each other's compatibility with the cooperation function.

Fifth Embodiment

In the fifth embodiment, an example of a merit in restricting, by using a cooperation function, a function incorporated in the direct print function will be described.

An example of the function incorporated in the direct print function is a function of notifying a partner of the information of an image format printable by a printer. An example of the restricted function is an XHTML print function. As a detailed example, since it is difficult to make a device completely compatible with XHTML because of restrictions unique to PTP, a CP 3020 and a PD printer 1000 share an XHTML subset rule unique to the cooperation function. PTP uses an 8-digit code "ObjectHandle" for file transfer. The description of this code is normally largely different from that of URL used to refer to an external file in XHTML. Hence, even when the user wants the direct print function running on PTP to print an XHTML file exchanged on the Internet without changing the format, the printer can not acquire the external file. It is therefore necessary to implement a mechanism to acquire the external file from the side of the PD printer 1000 by a means of some kind. If no means for determining the presence/absence of the mechanism is defined in the direct print function, the following problems occur.

A case will be examined in which the CP 3020 is compatible with XHTML print and the mechanism that makes a printer acquire an external file, and the device of the connected partner is a printer compatible with XHTML print. In this case, the CP 3020 does not know whether the printer compatible with XHTML print is compatible with the mechanism that makes the printer acquire an external file or is incompatible with the mechanism and can acquire no external file. For this reason, the print result of the printer of the connected partner may be different from the contents explicitly presented to the user on the CP 3020. A contrary case will be examined in which the printer is compatible with XHTML print and the mechanism to acquire an external file, and the device of the connected partner is a device that issues an XHTML print job. In this case, the printer does not know whether the partner device is compatible with the mechanism that makes the printer acquire an external file or is incompatible with the mechanism and issues an XHTML print job without external file acquisition. For this reason, the print result of the printer may be different from the contents explicitly presented to the user on the device of the connected partner.

As described above, it is sometimes impossible to safely and reliably operate the function set in the direct print function itself. In the fifth embodiment, how to effectively use the cooperation function to achieve the object of safely and reliably operating the function will be explained.

FIG. 19 is a flowchart for explaining an implementation example of a cooperation function between the CP 3020 and the PD printer 1000 according to the fifth embodiment of the present invention. The arrangements of the PD printer 1000 and CP 3020 according to the fifth embodiment are the same as in the above-described first embodiment, and a description thereof will be omitted. The same step numbers as in FIG. 17 denote the same processes in this flowchart. The CP 3020 and PD printer 1000 are compatible with the direct print and cooperation functions. The CP 3020 and PD printer 1000 have already completed the direct print & cooperation function confirmation in FIGS. 8A and 8B and confirmed that each other's compatibility with the direct print and cooperation functions. For the PD printer 1000 compatible with the direct print and cooperation functions and capable of printing an XHTML format, the cooperation function is set to make the printer compatible with the mechanism to acquire an external file. For the CP 3020 that is compatible with the direct print and cooperation functions and issues an XHTML print job, the cooperation function is set to make the CP 3020 compatible with the mechanism that causes the PD printer 1000 to acquire an external file.

In step S61, the PD printer 1000 receives a function information request. In step S91, the PD printer 1000 determines whether the operation is being performed in the direct print & cooperation function mode. If NO in step S91, the process advances to step S92 to generate Capability to support only images with the extension "JPG". In step S62, the PD printer 1000 transmits Capability to the CP 3020.

If the operation is being performed in the direct print & cooperation function mode in step S91, the process advances to step S93 to generate Capability to support images with the extension "JPG" and XHTML. In step S62, the PD printer 1000 transmits Capability to the CP 3020. In step S72, the CP 3020 receives Capability. XHTML is set because the CP 3020 of the connected partner compatible with the cooperation function can determine that the PD printer 1000 is compatible with the mechanism to acquire an external file and therefore determines that the PD printer 1000 can properly print the contents explicitly presented to the user on the CP 3020, as described above. If the PD printer 1000 is capable of XHTML print, the UI of the CP 3020 allows selection of "XHTML print". If the PD printer 1000 is incapable of XHTML print, the UI of the CP 3020 inhibits selection of "XHTML print". The operation of the UI in this case is the same as in the processes in steps S81 to S84 of FIG. 18, and a description thereof will be omitted.

When the user of the CP 3020 inputs a print instruction, the process advances to step S101 to determine whether the print target data contains an XHTML document. If the data contains no XHTML document, the process advances to step S102 to generate a print job and issue it to the PD printer 1000 as in step S73 (FIG. 17) described above.

If the data contains an XHTML document in step S101, the process advances to step S104 to determine whether a print job of the XHTML file can be issued. In this case, the CP 3020 determines whether the PD printer 1000 can print the XHTML file by using the mechanism to acquire an external file. If YES in step S104, the process advances to step S107. If NO in step S104, the process advances to step S108 to execute a print cancel process without issuing a print job. If it is determined that the print job can be issued for the XHTML file in step S104, the process advances to step S107 to associate an image designated in the XHTML file with a PTP object handle.

How to execute the association process will be described in detail with reference to FIGS. 20A, 20B, 21A, and 21B.

FIGS. 20A and 20B depicts views for explaining an example of the process of associating designated images in the XHTML file with PTP object handles according to the fifth embodiment of the present invention.

The XHTML file shown in FIG. 20A is the original file that the CP 3020 wants to print. The file contains reference to external files described by "<img>". The pieces of location information of the external files to be referred to are indicated by "xyz/a.jpg", "xyz/b.jpg", and "xyz/c.jpg" described next to "src=".

On PTP, object handles are assigned to all objects. Transfer/erase of objects is managed by the object handles. If the PD printer 1000 receives only the location information of a reference file designated by "server name/file path", the printer cannot know the object handle assigned to the object. Hence, the printer cannot send a file transfer request to the CP 3020 and acquire the external reference file. The CP 3020 modifies the XHTML file in FIG. 20A and generates a modified XHTML file (FIG. 20B) associated with PTP object handles. In the modified XHTML file, the location of each external reference file described by "<img>" in the original XHTML file is indicated by eight hexadecimal digits (0000000A, 0000000B, and 0000000C) next to "src=". Each of (0000000A, 0000000B, and 0000000C) indicates a PTP object handle necessary for making the PD printer 1000 acquire the external reference file. When the XHTML file itself is modified in this way, it is possible to designate images by the XHTML file in step S107 (FIG. 19) and associate them with PTP object handles.

FIGS. 21A and 21B depict views for explaining another example of the process of associating designated images in the XHTML file with PTP object handles according to the fifth embodiment.

The XHTML file in FIG. 21A is the same as that in FIG. 20A, and a description thereof will be omitted. The text (TXT) file shown in FIG. 21B describes the correspondence between the location information of the external reference files described by "<img>" of the XHTML file (FIG. 21A) and PTP object handles assigned to the files. The CP 3020 generates this file in step S107 described above. The CP 3020 transmits, to the PD printer 1000, both the TXT file and the original XHTML file as a print job. The PD printer 1000 grasps which PTP object handle should be used for a file transfer request to acquire each external reference file of the XHTML file (FIG. 21A). That is, without modifying the XHTML file itself, it is possible to designate images by the XHTML file and associate them with PTP object handles.

Two examples have been described above. The XHTML file (and association TXT file) that has undergone the association process and become printable by the PD printer 1000 is issued by the CP 3020 as a print job in step S102. The PD printer 1000 receives the print job in step S94 and executes it in step S95. During the process in step S96, the PD printer 1000 sends an external reference file transfer request (not shown) to the CP 3020. When the print job is ended, the PD printer 1000 notifies the CP 3020 of the end of the print job in step S96 and terminates the process. In step S103, the CP 3020 receives the print job completion notification and terminates the process.

If the process advances from step S101 to step S102, not XHTML file print but a normal print process is executed. A description of subsequent processes will be omitted.

If the process advances from step S104 to step S108, the XHTML file is not printable. A print cancel process is executed in step S108, and the process is terminated.

The XHTML file is determined not to be printable in the following situations.

If a character code set as "incompatible" as the cooperation function is used to describe the XHTML file.

If the description format of the XHTML file is a file format set as "incompatible" as the cooperation function to reduce the implementation load on the printer side (e.g., if a format to composite characters and images into one file, like a MINE-Multiplexed format, is set as "incompatible").

As described above, the cooperation function sets to use some functions originally incorporated in the direct print function. The side of the CP 3020 is inhibited from issuing a print job for any function except the cooperation function. The side of the PD printer 1000 restricts its function for a connected partner incompatible with the cooperation function and notifies the partner of function information. Hence, it is possible to safely and reliably operate the direct print function.

Even for a file that cannot directly be printed due to restrictions on the communication layer (PTP in this embodiment), the direct print function can safely and reliably be operated by setting the association process between the communication layer and the print file as the cooperation function.

The above embodiment has been described by exemplifying XHTML file print. However, the present invention is not limited to this. The same effect as described above can be obtained by any other page description language such as HTML. The file that associates the location information of an external reference file with a PTP object handle is a text (TXT) file. However, the present invention is not limited to this, and any other file format can be used.

In the above-described embodiments, the cooperated processing function has the following characteristics.

The cooperated processing function is an upper function including a camera direct function.

The cooperated processing function is a function different from the camera direct function and executed on the basis of it.

The cooperated processing function includes a protocol different from the camera direct function but is a function oriented to a device having the camera direct function.

A product compatible with both functions (both protocols) can also be considered. However, no command to shift to the cooperated processing function (second protocol) is prepared in the existing camera direct function (first protocol). Hence, even in a device compatible with both protocols, once communication by one protocol is established, it cannot easily be changed to the other protocol. The user preferably makes one protocol settable by himself/herself before the start of communication.

To freely switch between the two protocols, much time is required to, e.g., upgrade the existing camera direct function (first protocol) itself.

The above-described camera direct function (camera direct print function) fundamentally assumes a camera as an image transmission source. However, the present invention is not limited to this. Even an information communication device (e.g., PC or PDA) having no image capturing function may be used. The image transmission is not limited to a printer and may be a storage device that receives and stores an image.

Other Embodiment

The objects of the present invention are also achieved by supplying a storage medium which records software program codes to implement the functions of the embodiments to a system or apparatus and causing the computer (or CPU or MPU) of the system or apparatus to read out and execute the program codes stored in the storage medium. In this case, the program codes read out from the storage medium themselves implement the functions of the above-described embodiments. The storage medium that stores the program codes constitutes the present invention. Examples of the storage medium to supply the program codes are a Floppy® disk, hard disk, optical disk, magnetooptical disk CD-ROM, CD-R, magnetic tape, nonvolatile memory card, and ROM.

The functions of the above-described embodiments are implemented not only by causing the computer to execute the readout program codes but also by causing the OS (Operating System) running on the computer to wholly or partially execute actual processing on the basis of the instructions of the program codes.

The functions of the above-described embodiments are also implemented when the program codes read out from the storage medium are written in the memory of a function expansion board inserted to the computer or a function expansion unit connected to the computer, and the CPU of the function expansion board or function expansion unit wholly or partially executes actual processing on the basis of the instructions of the program codes.

The present invention is not limited to the above embodiments, and various changes and modifications can be made without departing from the spirit and scope of the present invention. To apprise the public of the scope of the present invention, the following claims are made.

CLAIM OF PRIORITY

This application claims the benefit of Japanese Patent Application No. 2004-245689 filed Aug. 25, 2004, which is hereby incorporated by reference herein in its entirety.

The invention claimed is:

1. A print system which transmits/receives a data object using a communication protocol and causes a print apparatus to print an image on the basis of image data supplied from an image supply device, wherein the communication protocol enables to automatically shift to a direct print function mode in accordance with communication of first information indicating presence/absence of the direct print function capable of directly transmitting image data from the image supply device to the print apparatus and printing, said image supply device having:
transmission means for transmitting, to the print apparatus, the data object containing the first information and second information indicating presence/absence of a cooperated processing function with the direct print function;

said print apparatus having:
determination means for determining whether received data object contains the first information and the second information; and
mode setting means for setting the cooperated processing function mode if said determination means determines that the data object contains the first information and the second information, and setting the direct print function mode if said determination means determines that the data object contains only the first information, and prohibiting to set the direct print function mode and the cooperated processing function mode if said determination means determines that the data object does not contain the first information.

2. The print system according to claim 1, wherein the first information and the second information are described in separate areas of the data object where arbitrary data can be described.

3. The print system according to claim 1, wherein the cooperated processing function includes cooperated processing with the direct print function on the basis of date/time information transmitted from the image supply device to the print apparatus.

4. The print system according to claim 1, wherein the cooperated processing function includes cooperated processing with the direct print function on the basis of information of at least one of a type/size of a font, a reception buffer size, and the maximum processible number of pixels in the print apparatus, the information being transmitted from the print apparatus to the image supply device.

5. The print system according to claim 1, wherein the cooperated processing function includes cooperated processing with the direct print function on the basis of information of at least one of a type/size of a font and a size of a liquid crystal display in the image supply device, the information being transmitted from the image supply device to the print apparatus.

6. The print system according to claim 1, wherein the cooperated processing function includes a print function of changing a print format of image to be printed by the print apparatus in accordance with a format of the image data supplied from the image supply device to the print apparatus.

7. The print system according to claim 1, wherein the cooperated processing function includes a function of changing a UI formed on the image supply device in accordance with an image format printable by the print apparatus.

8. The print system according to claim 1, wherein the cooperated processing function includes a function of changing a print job to be issued from the image supply device in accordance with an image and document format printable by the print apparatus.

9. The print system according to claim 8, wherein the cooperated processing function includes a function of, in a case that the image supply device issues a print job containing a structured document, updating the print job so as to designate, by the communication protocol, an image designated by the structured document.

10. The print system according to claim 1, wherein the communication protocol includes an image transfer protocol (PTP).

11. The print system according to claim 10, wherein the second information is described in a keyword area of ObjectInfoDataset of the PTP.

12. The print system according to claim 10, that wherein the first information is described in a file name area of ObjectInfoDataset of the PTP.

13. An image supply device which transmits/receives a data object using a communication protocol and supplies image data to a print apparatus, wherein the communication protocol enables to automatically shift to a direct print function mode in accordance with communication of first information indicating presence/absence of the direct print function capable of directly transmitting image data to the print apparatus and printing, comprising:
  transmission means for transmitting, to the print apparatus, the data object containing the first information and second information indicating presence/absence of a cooperated processing function with the direct print function;
  determination means for receiving the data object and determining whether the data object contains the first information and the second information; and
  mode setting means for setting the cooperated processing function mode if said determination means determines that the data object contains the first information and the second information, and setting the direct print function mode if said determination means determines that the data object contains only the first information, and prohibiting to set the direct print function mode and the cooperated processing function mode if said determination means determines that the data object does not contain the first information.

14. The image supply device according to claim 13, wherein the first information and the second information are described in separate areas of the data object where arbitrary data can be described.

15. The image supply device according to claim 13, wherein the cooperated processing function includes cooperated processing with the direct print function on the basis of date/time information transmitted to the print apparatus.

16. The image supply device according to claim 13, wherein the cooperated processing function includes cooperated processing with the direct print function on the basis of information of at least one of a type/size of a font, a reception buffer size, and the maximum processible number of pixels in the print apparatus, the information being transmitted from the print apparatus.

17. The image supply device according to claim 13, wherein the cooperated processing function includes cooperated processing with the direct print function on the basis of information of at least one of a type/size of a font and a size of a liquid crystal display in the image supply device, the information being transmitted to the print apparatus.

18. The image supply device according to claim 13, wherein the cooperated processing function includes a print function of changing a print format of an image to be printed by the print apparatus in accordance with a format of the image data supplied to the print apparatus.

19. The image supply device according to claim 13, wherein the cooperated processing function includes a print function of causing the print apparatus to execute frame print in accordance with a format of the image data supplied to the print apparatus.

20. The image supply device according to claim 19, wherein the cooperated processing function includes a function of, in a case that the image supply device issues a print job containing a structured document, updating the print job so as to designate, by the communication protocol, an image designated by the structured document.

21. The image supply device according to claim 13, wherein the cooperated processing function includes a function of changing a print job to be issued from the image supply device in accordance with an image and document format printable by the print apparatus.

22. The image supply device according to claim 13, wherein the communication protocol includes an image transfer protocol (PTP).

23. The image supply device according to claim 22, wherein the second information is described in a keyword area of ObjectInfoDataset of the PTP.

24. The image supply device according to claim 22, wherein the first information is described in a file name area of ObjectInfoDataset of the PTP.

25. A print apparatus for transmitting/receiving a data object to/from an image supply device using a communication protocol and receiving and printing image data, wherein the communication protocol enables to automatically shift to a direct print function mode in accordance with communication of first information indicating presence/absence of a direct print function capable of directly receiving image data from the image supply device and printing, comprising:
  reception means for receiving the data object from the image supply device;
  determination means for determining whether the data object received by said reception means contains the first information and second information indicating presence/absence of a cooperated processing function with the direct print function; and
  mode setting means for setting the direct print function & cooperated processing function mode if said determination means determines that the data object contains the first information and the second information, and setting the direct print function mode if said determination means determines that the data object contains only the first information, and prohibiting to set the direct print function mode and the cooperated processing function mode if said determination means determines that the data object does not contain the first information.

26. The print apparatus according to claim 25, wherein said transmission means transmits the data object containing the second information before the data object containing the first information.

27. The print apparatus according to claim 25, wherein the first information and the second information are described in separate areas of the data object where arbitrary data can be described.

28. The print apparatus according to claim 25, wherein the cooperated processing function includes cooperated processing with the direct print function on the basis of date/time information received from the image supply device.

29. The print apparatus according to claim 25, wherein the cooperated processing function includes cooperated processing with the direct print function on the basis of information of at least one of a type/size of a font, a reception buffer size, and the maximum processible number of pixels in the print apparatus, the information being transmitted to the image supply device.

30. The print apparatus according to claim 25, wherein the cooperated processing function includes cooperated processing with the direct print function on the basis of information of at least one of a type/size of a font and a size of a liquid crystal display in the image supply device, the information being received from the image supply device.

31. The print apparatus according to claim 25, wherein the cooperated processing function includes a print function of changing a print format of an image to be printed in accordance with a format of the image data received from the image supply device.

32. The print apparatus according to claim 25, wherein the cooperated processing function includes a print function of executing frame print in accordance with a format of the image data received from the image supply device.

33. The print apparatus according to claim 25, wherein the communication protocol includes an image transfer protocol (PTP).

34. The print apparatus according to claim 25, further comprising transmission means for transmitting the data object, to which the first and second information are added, to the image supply device.

35. The print apparatus according to claim 25, further comprising control means for controlling information to be included in the data object to be transmitted, among the first and second information, in accordance with the mode set by said mode setting means.

36. A control method of an image supply device which transmits/receives a data object using a communication protocol and supplies image data to a print apparatus, wherein the communication protocol enables to automatically shift to a direct print function mode in accordance with communication of first information indicating presence/absence of the direct print function capable of directly transmitting image data from the image supply device to the print apparatus and printing, comprising:
a step of transmitting, to the print apparatus, the data object containing the first information and second information indicating presence/absence of cooperated processing function with the direct print function;
determination step of receiving the data object from the print apparatus and determining whether the data object contains the first information and the second information; and
a setting step of setting the cooperated processing function mode if it is determined in said determination step that the data object contains the first information and the second information, and setting the direct print function mode if it is determined in said determination step that the data object contains only the first information, and prohibiting to set the direct print function mode and the cooperated processing function mode if it is determined that the data object does not contain the first information in said determination step.

37. A control method of a print apparatus which transmits/receives a data object to/from an image supply device using a communication protocol and receives and prints image data, wherein the communication protocol enables to automatically shift to a direct print function mode in accordance with communication of first information indicating presence/absence of the direct print function capable of directly receiving image data from the image supply device and printing, by comprising:
a reception step of receiving the data object from the image supply device;
a determination step of determining whether the data object received in said reception step contains the first information and second information indicating presence/absence of a cooperated processing function with the direct print function; and
a setting step of setting the direct print function & cooperated processing function mode if it is determined in said determination step that the data object contains the first information and the second information, and setting the direct print function mode if it is determined in said determination step that the data object contains only the first information, and prohibiting to set the direct print function mode and the cooperated processing function mode if it is determined that the data object does not contain the first information in said determination step.

38. An image supply device for transmitting/receiving a data object via communication means and supplying image data to a print apparatus, wherein the communication means enables to automatically shift to a first protocol in accordance with communication of first information indicating presence/absence of the first protocol capable of directly transmitting image data to the print apparatus and printing, by comprising:
transmission means for transmitting the data object via the communication means before of an establishment of communication based on one of the first protocol and a second protocol, the data object containing the first information and second information indicating compatibility with the second protocol different from the first protocol;
determination means for receiving the data object and determining whether the data object contains the first information and the second information; and
setting means for setting a cooperated processing function mode if said determination means determines that the data object contains the first and second information, and setting a direct print function mode if said determination means determines that the data object contains only the first information, and prohibiting to set the direct print function mode and the cooperated processing function mode if said determination means determines that the data object does not contain the first information.

39. The image supply device according to claim 38, wherein at least one of the first protocol and the second protocol has no instruction to arbitrarily shift to the other protocol during communication based on one of the first protocol and the second protocol.

40. A print apparatus for transmitting/receiving a data object via communication means and receiving image data from an image supply device to print, comprising:

reception means for receiving the data object from the image supply device;

transmission means for transmitting the data object via the communication means before a start of communication based on one of a first protocol and a second protocol, the data object containing first information indicating compatibility with the first protocol capable of directly transmitting the image data from the image supply device and printing and second information indicating compatibility with the second protocol different from the first protocol;

determination means for determining whether the data object received by said reception means contains the first information and second information indicating presence/absence of a cooperated processing function with a direct print function; and setting means for setting the second protocol if said determination means determines that the data object contains the second information, and setting the first protocol if said determination means determines that the data object contains no second information but the first information and prohibiting to set the first protocol and the second protocol if said determination means determines that the data object does not contain the first information.

41. The print apparatus according to claim 40, wherein at least one of the first protocol and the second protocol has no instruction to arbitrarily shift to the other protocol during communication based on one of the first protocol and the second protocol.

42. The print apparatus according to claim 40, further comprising means for transmitting the data object, to which the first and second information are added, to the image supply device.

43. The print apparatus according to claim 40, further comprising control means for controlling information to be included in the data object to be transmitted, among the first and second information, in accordance with setting set by said mode setting means.

* * * * *